US010428261B2

(12) United States Patent
Sabins et al.

(10) Patent No.: US 10,428,261 B2
(45) Date of Patent: Oct. 1, 2019

(54) RESIN COMPOSITE WITH OVERLOADED SOLIDS FOR WELL SEALING APPLICATIONS

(71) Applicant: CSI Technologies LLC, Houston, TX (US)

(72) Inventors: Freddie Lynn Sabins, Spring, TX (US); Jorge Esteban Leal, Houston, TX (US); Larry Thomas Watters, Spring, TX (US)

(73) Assignee: CSI TECHNOLOGIES LLC, Houston, TX (US)

( * ) Notice: Subject to any disclaimer, the term of this patent is extended or adjusted under 35 U.S.C. 154(b) by 81 days.

(21) Appl. No.: 15/617,985

(22) Filed: Jun. 8, 2017

(65) Prior Publication Data

US 2018/0355237 A1     Dec. 13, 2018

(51) Int. Cl.
  *C09K 8/508*     (2006.01)
  *E21B 33/12*     (2006.01)
  (Continued)

(52) U.S. Cl.
  CPC ............ *C09K 8/5086* (2013.01); *C04B 26/14* (2013.01); *C04B 28/04* (2013.01); *C09D 163/00* (2013.01);
  (Continued)

(58) Field of Classification Search
  CPC ......... C09K 8/50; C09K 8/5086; E21B 33/12; E21B 33/13
  See application file for complete search history.

(56) References Cited

U.S. PATENT DOCUMENTS 2,495,352 A    1/1950  Smith
3,308,884 A    3/1967  Robichaux
(Continued)

FOREIGN PATENT DOCUMENTS

EP    2363573 A1    9/2011
EP    2826761 A1    1/2015
(Continued)

OTHER PUBLICATIONS

European Search Report in related application EP18176832.6 dated Oct. 16, 2018.
(Continued)

*Primary Examiner* — Catherine Loikith
*Assistant Examiner* — Crystal J Miller
(74) *Attorney, Agent, or Firm* — Patterson + Sheridan, LLP

(57) ABSTRACT

In one embodiment, a method of formulating a sealant to span an opening and form a seal with surfaces across the opening is provided. The method further includes selecting a fluid material capable of contacting and adhering to the surface of the opening and which reacts to form a solid material as a result of a thermal reaction. The method further includes selecting and intermixing one or more solids with the fluid material to form a composite, wherein the solids migrate within a column of the composite sealant before the composite sealant cures from a fluid to a solid and bonds to the surfaces of the opening, and the change in volume of the lower portion of the composite sealant into which the solids have migrated, as the temperature thereof changes during curing, is insufficient to cause it to pull away from the surfaces of the opening or fail internally.

22 Claims, 6 Drawing Sheets

(51) Int. Cl.
*E21B 33/13* (2006.01)
*C04B 28/04* (2006.01)
*C09K 8/42* (2006.01)
*C09K 8/44* (2006.01)
*C09K 8/467* (2006.01)
*C09K 8/504* (2006.01)
*C09K 8/516* (2006.01)
*C04B 26/14* (2006.01)
*C09D 163/00* (2006.01)

(52) U.S. Cl.
CPC ............... *C09K 8/426* (2013.01); *C09K 8/44* (2013.01); *C09K 8/467* (2013.01); *C09K 8/508* (2013.01); *C09K 8/5045* (2013.01); *C09K 8/516* (2013.01); *E21B 33/12* (2013.01); *E21B 33/13* (2013.01)

(56) References Cited

U.S. PATENT DOCUMENTS

| | | |
|---|---|---|
| 3,416,604 A | 12/1968 | Rensvold |
| 4,189,002 A | 2/1980 | Martin |
| 4,526,232 A | 7/1985 | Hughson et al. |
| 4,817,719 A | 4/1989 | Jennings, Jr. |
| 5,295,541 A | 3/1994 | Ng et al. |
| 5,314,023 A | 5/1994 | Dartez et al. |
| 5,377,757 A | 1/1995 | Ng |
| 5,484,020 A | 1/1996 | Cowan |
| 5,503,227 A | 4/1996 | Saponja et al. |
| 5,531,272 A | 7/1996 | Ng et al. |
| 5,649,594 A | 7/1997 | Flak et al. |
| 5,833,001 A | 11/1998 | Song et al. |
| 5,873,413 A | 2/1999 | Chatterji et al. |
| 5,875,845 A | 3/1999 | Chatterji et al. |
| 5,875,846 A | 3/1999 | Chatterji et al. |
| 5,957,204 A | 9/1999 | Chatterji et al. |
| 5,969,006 A | 10/1999 | Onan et al. |
| 6,006,835 A | 12/1999 | Onan et al. |
| 6,006,836 A | 12/1999 | Chatterji et al. |
| 6,244,344 B1 | 6/2001 | Chatterji et al. |
| 6,321,841 B1 | 11/2001 | Eoff et al. |
| 6,478,088 B1 | 11/2002 | Hansen et al. |
| 6,979,366 B2 | 12/2005 | Chatterji et al. |
| 7,219,732 B2 | 5/2007 | Reddy |
| 8,235,116 B1 | 8/2012 | Burts, Jr. et al. |
| 8,240,387 B2 | 8/2012 | Hoffman et al. |
| 8,703,659 B2 | 4/2014 | Dalrymple et al. |
| 8,899,328 B2 | 12/2014 | Zamora et al. |
| 9,522,981 B1 | 12/2016 | Dziwok et al. |
| 2004/0211557 A1 | 10/2004 | Cole et al. |
| 2004/0226717 A1* | 11/2004 | Reddy ............... C09K 8/44 166/295 |
| 2005/0082066 A1 | 4/2005 | McGuire et al. |
| 2005/0241855 A1 | 11/2005 | Nylie et al. |
| 2005/0263282 A1 | 12/2005 | Jeffrey et al. |
| 2005/0269080 A1 | 12/2005 | Cowan |
| 2007/0163783 A1 | 7/2007 | Head |
| 2007/0209797 A1 | 9/2007 | Brink et al. |
| 2008/0023205 A1 | 1/2008 | Craster et al. |
| 2008/0135251 A1 | 6/2008 | Nguyen et al. |
| 2008/0264637 A1 | 10/2008 | Buds et al. |
| 2008/0277117 A1 | 11/2008 | Burts, Jr. et al. |
| 2008/0302542 A1 | 12/2008 | Pessin et al. |
| 2009/0078419 A1 | 3/2009 | Dusterhoft |
| 2009/0149354 A1 | 6/2009 | Dajani et al. |
| 2009/0253594 A1 | 10/2009 | Dalrymple et al. |
| 2009/0301720 A1 | 12/2009 | Edwards et al. |
| 2010/0051266 A1 | 3/2010 | Roddy et al. |
| 2010/0116504 A1 | 5/2010 | Hoffman et al. |
| 2010/0122650 A1 | 5/2010 | Hoffman et al. |
| 2011/0088916 A1 | 4/2011 | Heijnen |
| 2011/0192594 A1 | 8/2011 | Roddy et al. |
| 2011/0199228 A1 | 8/2011 | Roddy et al. |
| 2011/0203795 A1 | 8/2011 | Murphy et al. |
| 2011/0277996 A1 | 11/2011 | Cullick et al. |
| 2011/0284247 A1 | 11/2011 | Zamora et al. |
| 2011/0290501 A1 | 12/2011 | Duncan et al. |
| 2012/0328377 A1 | 12/2012 | Brenneis et al. |
| 2013/0118752 A1 | 5/2013 | Hannegan et al. |
| 2013/0233551 A1 | 9/2013 | Lin et al. |
| 2013/0269948 A1 | 10/2013 | Hoffman et al. |
| 2013/0284445 A1 | 10/2013 | Hughes |
| 2013/0319671 A1 | 12/2013 | Lund et al. |
| 2014/0048265 A1 | 2/2014 | Combs et al. |
| 2014/0076563 A1 | 3/2014 | Lin et al. |
| 2014/0213490 A1 | 7/2014 | Ogle et al. |
| 2014/0251612 A1 | 9/2014 | Powers |
| 2014/0262269 A1 | 9/2014 | Watters et al. |
| 2014/0264822 A1* | 9/2014 | Horikiri ............... C08K 5/101 257/734 |
| 2014/0299812 A1 | 10/2014 | Ozdoruk |
| 2014/0357535 A1 | 12/2014 | Tang et al. |
| 2014/0367105 A1 | 12/2014 | Karcher et al. |
| 2015/0083400 A1 | 3/2015 | Stephenson et al. |
| 2016/0108305 A1 | 4/2016 | Murphy et al. |
| 2016/0168030 A1 | 6/2016 | Teichert et al. |
| 2016/0348464 A1 | 12/2016 | Sabins et al. |
| 2017/0044864 A1 | 2/2017 | Sabins et al. |
| 2017/0044865 A1 | 2/2017 | Sabins et al. |
| 2017/0121610 A1 | 5/2017 | Niccum et al. |
| 2017/0350212 A1 | 12/2017 | Sabins et al. |
| 2018/0038061 A1 | 2/2018 | Combs et al. |
| 2018/0355692 A1 | 12/2018 | Sabins et al. |

FOREIGN PATENT DOCUMENTS

| | | |
|---|---|---|
| EP | 3130746 A1 | 2/2017 |
| GB | 2407835 A | 5/2005 |
| WO | 01/90531 A1 | 11/2001 |
| WO | 2012057631 A1 | 5/2012 |
| WO | 2014200889 A1 | 12/2014 |
| WO | 2015034473 A1 | 3/2015 |
| WO | 2015034474 A1 | 3/2015 |
| WO | 2016024990 A1 | 2/2016 |
| WO | 2017/196955 A1 | 11/2017 |

OTHER PUBLICATIONS

Hyne, Norman J.—Dictionary of Petroleum Exploration, Drilling, & Production, Jan. 1, 1991, PennWell Books, Tulsa, Oklahoma, XP055319754, ISBN: 978-0-87814-352-8, pp. 483-484.
Negin, Chegenizadeh—"Most common surfactants employed in chemical enhanced oil recovery," Petroleum 3 (2017) 197-211.
Momentive, Technical Data Sheet, Silquest A-187, HCD-10052, Mar. 13, 2018, 4 total pages.
Ellis, Bryan—"Chemistry and Technology of Epoxy Resins", Springer Science+Business Media, 1993, pp. 1-71.
Sabins et al.—Office Action in related U.S. Appl. No. 15/617,976 dated Sep. 24, 2018.
EPO Extended European Search Report dated Oct. 18, 2018, for European Application No. 18176831.8.

* cited by examiner

RESIN COMPOSITE WITH OVERLOADED SOLIDS FOR WELL SEALING APPLICATIONS

BACKGROUND OF THE INVENTION

Field of the Invention

Embodiments hereof relate to the sealing of wells used to produce hydrocarbons from subsurface formations penetrated thereby. More particularly, embodiments hereof relate to the formulation of sealants used to seal wells, and the application thereof at a location within a well to be sealed.

Description of the Related Art

Epoxy (resin introduced as a fluid and hardened in situ) is used as a specialty sealant in the upstream petroleum industry for repairing leaks originating in well barriers, i.e., to repair leaks in a cement sheath previously formed between sections of casing of different diameters, previously formed around the casing to seal between the casing and the earth of the drilled well bore, and previously formed at other locations of the well or casing. The leaks best suited to being repaired using epoxy resin, as opposed to using additional cement sealant, are usually small in cross-sectional area and difficult to access which makes the use of Portland cement, the traditional sealant for sealing well leaks, ineffective. Since epoxy resin is initially prepared in a fluid state by intermixing one or more resins and one or more hardeners, along with additives such as reaction accelerators and weighing agents, which mixture then reacts to harden and form a solid seal, it is ideally suited to be injected into small areas, such as pores or cracks in a previously formed Portland cement seal through which a leak is occurring, and allowed to set to form a seal to seal the cracks or pores in the previously placed seal material, and hence, the leak. Since epoxy in fluid form is cohesive in water or brine, an epoxy fluid formulated to be denser than well fluid can be introduced into a brine-filled casing or annulus significantly above a leak location in a well, below which a packer or other obstacle is set. Thus the epoxy can be introduced at the top of the well, and will fall to the bottom of the brine-filled space, where it will set and form a seal.

Volumetric penetration, i.e., the ability to enter into openings such as pores or cracks in a previously formed seal, or into a formation from which hydrocarbons have or may be produced, and the cohesion characteristics of epoxy resin when exposed to brine, make epoxy resin an ideal sealant for difficult well sealing applications in which remediation with Portland cement would require extensive well preparation (drilling, milling and cutting the casing, etc.) and large sealant volumes. Epoxy resin sealant can be locally mixed adjacent to the well location and placed therein using normal petroleum industry mixing and well introduction methods. Repairs of a failed or failing Portland cement well seal using an epoxy resin sealant usually requires significantly (as much as 10 times) less volume of sealant as compared to the sealant volume required when using additional Portland cement to repair a failed or failing Portland cement seal. This reduced volume of sealant is a consequence of epoxy resin's superior mechanical properties, its cohesiveness which inhibits contamination and intermixing therewith with other well fluids which degrades the resulting seal integrity, and its superior penetrating ability into small openings, as compared to Portland cement.

One detrimental feature of epoxy is that the setting of epoxy, i.e., the hardening thereof from a liquid (fluid) to a solid form, is an exothermic chemical reaction, and because the epoxy has low thermal conductivity and low heat capacity, it experiences an increase in temperature after the resin and hardener are intermixed and the exothermic reaction there between initiates and progresses. The heat of this exothermic reaction can produce a large temperature increase in the epoxy as it sets, particularly when large volumes of resin contain a high hardener concentration which is often required to obtain desirable setting times when the epoxy is used as a sealant in low-temperature (<100° F.) environments. For any given volume of epoxy in a cohesive fluid form, a given percentage increase in the volume of the fluid does not result in a corresponding same percentage increase in the surface area of the volume. Considering a sphere as an example, when the radius of the sphere is increased, the volume of the sphere increases as a cube of the radius, whereas the surface area increases as a square of the radius. Thus, as the volume of a batch of epoxy resin being mixed is increased, the ratio of the surface area ($cm^2$) to the volume ($cm^3$) thereof decreases. Because the setting reaction is exothermic, as the volume of the batch of epoxy increases, more heat becomes trapped therein as the effective area through or from which heat transfer out of the batch must occur, i.e., the exterior surface, is a smaller relative percentage of the volume of the batch of epoxy resin. These same geometric results are inherent in the typical cylindrical or annular geometry of well seals, particularly those in large casings on the order of greater than 8 to 30 inches in diameter. In addition to the reaction of resin and hardener being exothermic, the reaction rate of hardener and resin is temperature dependent, and the higher the temperature of the batch of epoxy in fluid form, the faster the resin-hardener reaction occurs.

Temperature increase in the resin during the epoxy setting reaction is detrimental to forming a satisfactory epoxy seal in a well. Epoxy thermal properties exacerbate these detrimental effects. First, epoxy in both a fluid and a solid state has a high coefficient of thermal expansion. Second, the heat capacity of epoxy in both the fluid and the solid state is low; considerably lower than that of steel, Portland cement, or the subterranean earth formations around the well casing. Third, the thermal conductivity of epoxy resin is low compared to that of steel, Portland cement, or subterranean formations with which it must form sealing contact.

Plugging wells with epoxy sealants during abandonment operations typically requires placing large volumes (2 to 10 barrels) of mixed epoxy in fluid form in large-diameter casing (12 inches to 30 inches in diameter). These sealing applications are usually in offshore wells requiring high-performance plugs to seal the interior of the casing at the top of the well, close to the mud line. With ambient temperatures at this seal location ranging from 40° F. to 80° F., the setting reaction of the epoxy can self-generate a temperature increase in the volume of setting epoxy ranging from 200° F. to 400° F. As the temperature of the setting epoxy increases, the hardener-resin reaction rate increases resulting in further heat generation from the exothermic setting reaction. Thus, the thermal:mass:reaction rate effect is a chain reaction which can push the maximum temperature generated in a large volume of epoxy to significantly higher temperatures as it sets.

Because the resin-hardener reaction and reaction rate are temperature dependent, where epoxy is used to form a seal in a lower temperature region of the well, for example adjacent to the mudline to harden within a reasonable time period, the hardener concentration of the batch is increased and reaction accelerators are used to increase the setting reaction rate and thereby reduce the setting time of the batch. Increased hardener concentration to cause the resin-hardener reaction to occur faster at lower ambient temperatures further increases reaction rate and the maximum temperature reached by the batch or mix of epoxy.

In an example of the effect of the resin-hardener reaction on the temperature of the epoxy, a 4-gallon quantity of epoxy in a 5-gallon bucket (about 2 feet high having a diameter of 12") qualifies as a large resin volume with low surface area to volume ratio. Four gallons of a resin formulation consisting of 100 parts resin, 30 parts diluent, 30 parts high-temperature hardener, 10 parts silane, and 7 parts reaction accelerator mixed at room temperature in a 5-gallon steel bucket and allowed to cure thereafter reached a maximum temperature at a location 2-inches inwardly of the bucket wall of 329° F., a temperature increase of 257° F. of the epoxy batch from the mixing temperature to the maximum temperature. The temperature of the epoxy at the center of mass thereof was substantially higher In known sealant designs, the sealant designer considers the temperature of the well at the sealing location thereof, the setting time of the resin-hardener and accelerator mixture as measured from the beginning of mixing, the mixing time of the batch of epoxy, and the time needed to pump the volume of the batch of epoxy that once mixed must be pumped to the sealing location before it hardens to the point where it can no longer be pumped, as the variables of the sealant design, also known as the sealant formulation, to be optimized. However, the exothermic nature of the resin-hardener reaction, in combination with the thermal properties of the epoxy, is detrimental to predictably forming a sealing plug with the use of epoxy. First, the hardener-accelerator combination reacts with the resin in such a way that the maximum temperature is reached while the material is still in the fluid state. This reaction rate-solidification timing is the same when using low-temperature or high temperature hardener in the epoxy system, an epoxy system meaning a formulation of epoxy components for a specific sealing application. The epoxy thus heated begins solidifying shortly after the maximum temperature thereof is reached, and cools as the setting reaction continues and the epoxy further hardens. The epoxy also heats the adjacent casing with which it is to form a seal. The epoxy and the casing then slowly, over the course of 6-36 hours, cool back to the ambient well temperature. The Coefficient of Thermal Expansion (CTE) for set, i.e., hardened, epoxy is several times larger than that of steel, the most common material to which the epoxy must bond to form a sealing plug.

As the epoxy mixture sets, it also heats the adjacent steel to, or near to, the high resulting epoxy temperature at the interface of the steel and epoxy, and thereafter the set epoxy and the steel cool to the ambient temperature of the earth surrounding the sealing location. Because of the difference in coefficients of thermal expansion therebetween, during cooling from the epoxy reaction temperature to the ambient temperature, the epoxy (reacted resin-hardener mixture) contracts more than does the steel, thereby putting stress on the interfacial bond therebetween. In fact, in some cases of rapid setting epoxy formulations and thus rapid curing thereof, the stresses resulting from the contraction of the solidified epoxy as it cools results in the epoxy trying to pull away from the bonding surface thereof with the steel, which can generate internal cracks in the epoxy thereby forming a fluid leak path there through, or causes gaps or openings between the seal and the casing, or within the volume of the epoxy directly adjacent to the casing. Second, epoxy has a low heat capacity. Because the heat of reaction of the epoxy drives the resultant temperature increase of the epoxy higher than for materials with higher heat capacity. This attribute results in a greater temperature increase from the heat of reaction, thereby increasing the overall thermal contraction during cooling from that higher temperature and associated stresses.

Finally, having inherent low thermal conductivity, epoxy is a relatively good insulator slowing transfer of thermal energy therethrough, and particularly as the distance from the center of mass of the epoxy resin to the heat transfer boundary, i.e. the surface of the volume of epoxy, increases. This heat retention property also increases the maximum temperature that a large mass of curing epoxy resin will reach during the exothermic setting reaction.

Improving the CTE, heat capacity, and thermal conductivity properties of epoxy resins for applications requiring large fluid volumes at relatively low application temperatures would improve the sealing performance of epoxy sealants. The maximum temperature generated during curing could be reduced if the epoxy had a greater heat capacity, which would lower the temperature increase from the exothermic reaction, and a greater thermal conductivity, which would allow heat to flow from the volume of epoxy more quickly. A lower coefficient of thermal expansion of the hardened epoxy would result in less shrinkage of the epoxy volume, and less stress on the epoxy to casing seal. However, simply designing an epoxy formulation to minimize CTE while maximizing heat capacity and thermal conductivity is not sufficient to ensure formation of a durable well seal.

SUMMARY

Herein, a composite sealing material delivered to a sealing location in fluid slurry form, and in which constituents thereof react to form a solid sealing plug in the sealing location, is composed of a fluid sealing material, such as epoxy or Portland cement, and one or more solids, wherein the solids migrate under the influence of gravity when the slurry is in a static, i.e., non-mixing or pumped, mode and the resulting slurry in fluid form, and the sealing plug in solid form, becomes segregated into a solids depleted portion from which solids have migrated, and a solids enhanced portion physically below the solids depleted portion into which solids have migrated from the solids depleted portion. The resulting static slurry, and sealing plug has a lower portion having a greater quantity of solids therein than is mixable and pumpable to the sealing location in the well when using standard oilfield equipment, and the resulting properties of the solids enriched portion yield a more reliable seal with a lower maximum exothermic reaction based temperature rise, and a shorter time from the exothermic reaction induced peak temperature to the sealing material reaching the temperature of the ambient surrounding the sealing location, as compared to a sealing composite wherein solids are relatively uniformly mixed therein at or below the limit at which the resulting fluid slurry can be pumped to the sealing location using standard oilfield equipment. Thus, the seal designer, and the sealing operation operator, can deliver a composite sealing material in fluid slurry form to a sealing location with a high degree of confidence that the fluid slurry sealant will, upon hardening, seal the well.

After the solids settle or migrate to form the solids depleted and solids enhanced portions of the fluid slurry, the sealing material base cures and hardens to form a solid plug in the well. After solids migration, and epoxy hardening, the upper portion of the solid plug consists of epoxy with a very low concentration of solids, or no solids at all, therein. The lower portion of the sealing plug includes the solids of the upper, now depleted, region which have settled or migrated thereinto, in addition to the solids originally therein when the fluid slurry was located in the sealing location, and thus the solids content consists of greater than 30% solids by volume of the solids-resin composite. In the resulting column of sealant, the volume thereof which is solids depleted is on the order of 30 to 40% of the total column volume, whereas the portion thereof which is solids enhanced is on the order of 60-70% of the total column volume. Thus, the concentration of solids in the solids enhanced portion can reach 160 to 170% of the solids concentration of a fluid slurry which can be mixed and pumped using standard oilfield equipment. The concentration of solids in the high-solids portion of the sealant plug are significantly above the maximum level of solids loading to result in a pumpable slurry. Thus, the formulation and placement method hereof results in producing a sealant plug with high concentration of solids. By selecting the solids to have thermal properties complementary to those of the fluid sealant material, the resulting seal is formed at a lower temperature, and thus the thermal stress effects of the setting reaction of the sealant are reduced and an effective seal is predictably and reliably formed.

The resulting composite epoxy sealant, in the lower portion of the column of sealant, contains a blend of solid particulate materials designed to maximize the composite sealant's thermal conductivity and heat capacity while minimizing the CTE thereof to improve sealant bonding to the casing or other surfaces of the well in low-temperature applications. In one aspect, methods to assess the reaction kinetics and strength development profile of specific epoxy-solids composites under specific well conditions and seal geometries are provided, so that the thermal properties of the epoxy-solids composite can be optimized to allow epoxy based sealants to be formulated over a range of well conditions, potential epoxy materials, and potential solid particulate materials. Likewise, these methods to assess the reaction kinetics and strength development profile are likewise applicable to Portland cement-solids and non-epoxy thermosetting resin-solids composites under specific well conditions and seal geometries, and thus the thermal properties of the Portland cement-solids composite can be optimized to allow sealants to be formulated over a range of well conditions, potential sealant materials, and potential solid particulate materials.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
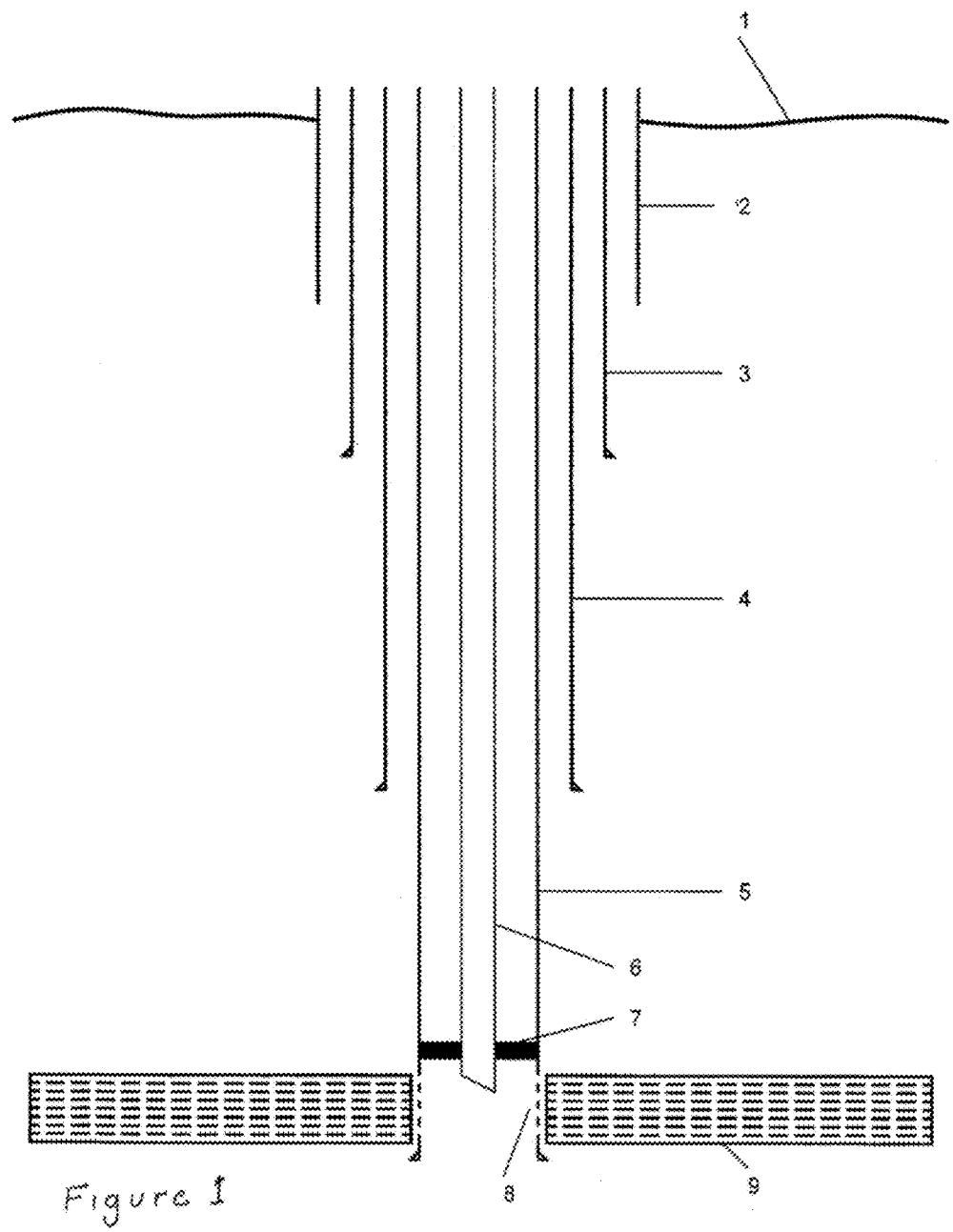
FIG. 1 is a schematic sectional view of an offshore well targeted for abandonment.

Herein, methods for the addition of particulate solids to a resin epoxy to form composite slurry that sets into a composite solid sealing plug after solids in the epoxy settle into the lower portion of a sealing volume of epoxy in the well, and specific such formulations, are described. The epoxy-solids composite is engineered so that the solids incorporated therein increase the heat capacity and thermal conductivity of the composite as compared to a traditional epoxy sealant, while lowering the CTE thereof as compared to a traditional epoxy sealant. Sufficient thermal property improvements of the epoxy-solids composite over a non-solids containing epoxy sealant are made to lower the peak temperature of the setting epoxy enough to prevent stress resulting from shrinkage of the cooling epoxy-solids composite from generating an internal failure of the seal or bond failure between the seal material and the casing. More specifically, in the fluid volume of the epoxy located in the well, solids are provided at or near the mixable and pumpable limit of solids loading into the epoxy in a fluid state, and solids in the upper portion of the volume of epoxy in the sell settle into a lower portion of the volume of epoxy, and the lower, wherein the lower, solids enriched portion has a solids loading exceeding that mixable and pumpable with standard oilfield equipment, and resulting thermal properties which are better than those achievable with a relatively uniform mixture of solids and epoxy at or below the solids loading limit of a resulting epoxy-solids composite. Both portions of the sealant set into a hardened material in the well, but only the solids enhanced portion need form the sealing plug, and thus the total volume of epoxy-solids composite pumped into the well is selected based upon the predicated, and predictable, settling of the solids into the lower portion such that the height or volume of the solids enhanced portion is sufficient to form a sealing plug in the well given the ambient well conditions. Herein, the reaction kinetics and strength development profile of the epoxy-solids composite plug remain sufficiently aggressive to ensure the composite material hardens into a strong, resilient barrier in an acceptable time, even with a lower maximum temperature resulting from the exothermic resin-hardener reaction. Additionally, by proper selection of solids as detailed herein, the epoxy-solids composite is pumpable in fluid form the sealing location of the well, and after being located at the sealing location, the solids therein migrate or settle under the influence of gravity into the lower portion of the volume of epoxy-solids composite. Where the solids content of the epoxy-solids composite as pumped is at, or close to, the solids content at which the viscosity or other fluid properties of the composite will prevent pumping the composite to the well, the resulting solids concentration in the lower part of the volume of the epoxy-solids composite slurry is increased to a level in situ at which the epoxy-solids composite slurry could not be pumped. The volume of epoxy-solids composite slurry pumped to the well to harden and form a sealing plug is greater than the volume of sealant normally required for the sealing application. The epoxy-solids composite slurry is designed such that upon migration or settling of the solids from the upper portion into the lower portion of the volume of epoxy, the enhanced solids portion has a volume and resulting height at least as large as that required for the sealing application. By increasing the solids content of the epoxy-solids composite slurry above that which is mixable and pumpable using standard oilfield equipment, the effects of the increased temperature of the composite resulting from the exothermic resin-hardener reaction of the epoxy are substantially reduced, resulting in the formation of a composite which has a high likelihood of effecting a successful seal in the sealing location of the well, thus reducing the risk associated with sealant delivery and subsequent failure of the seal.

Solids are routinely added to well sealants to alter their density or control fluid phase permeation thereof. A well sealant having non-reacting solids content must be designed to produce a mixable, pumpable slurry. Other than to modify the resulting sealant density, wettability on mixing, and suspension stability, no design effort has been invested into the incorporation of solids into well sealants.

Herein, a method of estimating thermal properties and reaction kinetics behavior of a sealant-solids composite, in particular an epoxy-solids composite, to produce a durable seal for a composite epoxy sealant and epoxy based well seal application, is provided. The epoxy-solids composite is engineered from an epoxy resin-hardener-accelerator-additives composition with the addition of solid particulate materials that improve the thermal properties of the resulting epoxy-solids composite sealant as compared to a traditional epoxy sealant. Sealant performance criteria, and a method to design a composite sealant with appropriate thermal properties, reaction kinetics, and strength development profile using these performance criteria, are disclosed. Because the solids concentration of the sealant material, for example an epoxy-solids composite, can be enhanced in situ to exceed that which can be mixed and pumped in the field, the resulting thermal properties of the composite, and seal, exceed those otherwise producible.

The improvement in sealant performance from the incorporation of desirable solids therein is derived from control of performance consequences arising from temperature increases produced by the exothermic setting reaction of the sealant by proper selection of solids, epoxy resin, hardener, and additives.

Herein, the epoxy-solids mixture in fluid form forms a composite slurry that segregates, due to solids settling, into two distinct volumes having different material properties after placement at the sealing location. After the solids settle or migrate from the upper portion to the lower portion of a column of the composite slurry, the epoxy cures and hardens to form a solid plug in the well. After this segregation of the composite slurry into an upper substantially solids depleted portion, and a lower portion having a solids content enhanced (increased) by the incorporation of the solids of the upper portion therein, and hardening, the upper portion of the resulting solid sealing plug is solid epoxy with very low concentration of solids or no solids at all. The lower portion in which the settled, segregated solids reside can have greater than 30% solids by volume of high-solids concentration epoxy-solids composite, which percentage is the limit of incorporation of large surface area solids into an epoxy which is then still pumpable. The volumes of resin-rich sealant to the segregated, high-solids concentration sealant below, is around 40 vol % resin-rich/solids depleted to 60% solids enhanced resin. The concentration of solids in the high-solids portion of the sealant plug are significantly above (up to 1.5 to 2.5 times) the maximum level of solids loading to result in a pumpable slurry. Thus, the formulation and placement method results in producing a sealant plug with a high concentration of solids.

The solids incorporated into the epoxy-solids composite are selected so as to increase the heat capacity and thermal conductivity of the resulting composite in the lower portion of the column of composite material as compared to a non-solids incorporating epoxy or an epoxy column of uniform solids concentration, while lowering the CTE thereof. Sufficient thermal property improvements of the resulting composite are produced to lower temperature of the setting epoxy enough to prevent resulting stresses from generating sealing material failure or sealant-to-casing or other well structure bond failure. The reaction kinetics and strength development profile of this modified composite plug must remain sufficiently aggressive to ensure the material hardens to a strong, resilient barrier in an acceptable time as a result of the exothermic resin-hardener reaction of the epoxy, even with less heat generated per unit volume of the solids containing portion of the sealant. The ability to create high solids loading by sealant self-segregation resulting from solids settling or migration in situ increases the effects of the solids on the thermal and mechanical properties and reaction kinetics of the resulting lower portion of the sealant material. The positive effects of engineered solids at this now-achievable loading produce significantly higher heat capacity and thermal conductivity and lower CTE of the resulting composite slurry and composite solidified sealant.

Herein are provided methods of estimating thermal properties and reaction kinetics behavior of a sealant-solids composite, in particular an epoxy-solids composite, to enable a sealant designer to produce a durable seal using a composite epoxy-solids sealant in a well sealing application. The composite is engineered from an epoxy resin-hardener-accelerator-additives composition with the addition of particulate solid(s) materials that improve the thermal properties of the resulting composite sealant as compared to a non-engineered epoxy sealant material. The concentration of the solids, along with their beneficial effects, is increased by in situ settling or migrating of the solids within the volume of epoxy under the influence of gravity, to cause self-segregation of the sealant material into a solids depleted portion above a solids enhanced portion, to thereby form a sealing plug of the lower portion of the sealant to increase seal effectiveness significantly over a that of a composite that could be traditionally placed. Sealant performance criteria and a method to design a composite sealant with appropriate set time, settling characteristics, thermal properties, reaction kinetics, and strength development profile are provided herein.

The improvement in sealant performance from the incorporation of desirable solids therein is derived from control of performance consequences arising from temperature increases produced by the exothermic setting reaction of the sealant by proper selection of solids, epoxy resin, hardener, and additives. Solid particulate materials are chosen to allow wettability, mixability, and pumpability of the resulting composite at maximum particulate loading thereof into the epoxy mixture. The particle size distribution is tailored to allow maximum loading to achieve a mixable, pumpable slurry that undergoes settling and solids segregation when static after placement. The settling characteristics, thermal conductivity, heat capacity, and CTE of the solids are optimized by combining materials with desired particle size, density, and thermal properties to produce a settling composite sealant in which the high-solids fraction produced after segregation has thermal performance superior to that of a resin sealant alone or a particle resin composite designed to be a stable slurry. Although the incorporation of solids into epoxy resin is described herein in detail, the same principles apply other thermosetting resins and for Portland cement.

The first benefit derived from addition of settling solid particulate material to epoxy resin is increased dilution of the resin per unit volume of the high-solids portion thereof as compared to a non-solids modified sealing mixture of a solids modified sealing mixture where the solids do not migrate, even at the maximum solids loading of the slid(s) into the epoxy or other sealing material. Since the heat of reaction is a specific function of resin mass, lowering the mass of resin per unit volume of sealant reduces the quantity of heat produced from the exothermic resin-hardener reaction per unit volume thereof. As dilution of the resin with settled inert solid particulates reduces the total thermal energy released in the reaction, it thus reduces the maximum temperature of the composite as compared to a composite having the pumpable concentration of solids therein. The high concentration of solids settling or migrating into the solids-rich portion of the sealant provides significantly more dilution of the resin per unit volume in the solids enhanced portion of the column of sealing composite than that achieved of a stable, pumpable slurry. Since the heat of reaction is a specific function of resin mass, lowering the mass of resin per unit volume of the composite mixture as mixed, and as applied to the sealing location, lowers the heat produced from the exothermic resin-hardener reaction per unit volume thereof, for example per cubic centimeter or cubic inch thereof. Where the same volume of an epoxy-solids composite is used in place of a traditional epoxy sealant, the dilution of the resin volume of the composite with inert solid particulates reduces the total thermal energy released in the epoxy-hardener reaction as compared to an epoxy only or epoxy solids composite at the solids loading pumping or mixing limit, thus reducing the maximum temperature increase of the composite.

The following three thermal property modifications provided by the solid particulates substantially alter the epoxy-solid composite's response to the evolved heat of the resin-hardener reaction. Table 1 below contains representative thermal property data for various materials. These data will be used to illustrate the benefits (additional to dilution) derived from use of the solid particulate material.

Table 1 data shows that cured epoxy resin has a relatively low heat capacity and a low thermal conductivity. As a result, heat generated by the setting reaction of the epoxy will cause the reaction temperature of the material to increase as the resin-hardener reaction goes forward. Additionally, because cured (solidified) epoxy without the added solid particulates has low thermal conductivity, heat transfer out of the mass of epoxy to cool the cured epoxy seal material is slow. In contrast, the coefficient of thermal expansion of the epoxy is relatively high. Thus, as epoxy sets and the resin-hardener reaction releases thermal energy, the temperature of the epoxy in the fluid state will increase significantly, and the heat of the resin-hardener reaction will be lost slowly (slow cool down plus higher ultimate temperature due to the insulating property of the epoxy). The resin-hardener reaction in epoxy mixes having large resin volumes with low surface area to volume ratios thereof produces a maximum mixture temperature while the resin is still in a fluid state. Thus, the resin solidifies (sets) at or near its maximum temperature. The high coefficient of thermal expansion would result in the set epoxy contracting, i.e., the volume thereof shrinks, significantly as it cools in the well as compared to other well materials if it were not also adhered to the casing(s) in the well. If the epoxy resin bonds to steel in the well to form the seal when both are at an elevated temperature, cooling will generate internal tensile stress in the resulting epoxy seal plug, and also stress at the bonding interface as the epoxy contracts more than the steel. This stress can generate cracks in the set epoxy, or break the bond at the epoxy:steel interface. Either of these failures will disrupt the seal and render it ineffective. Applicants have found, based on direct observation, that as a columnar volume of epoxy, for example a right circular volume of epoxy, sets or cures in contact with a material having a higher coefficient of thermal expansion and in a surrounding room temperature ambient, the conversion from fluid to solid occurs inwardly of the outer surface of the volume of epoxy, ultimately leaving a thin layer of fluid epoxy mixture surrounding a solidified volume of epoxy. As a result, as this thin layer solidifies, the stress of further shrinkage of the epoxy resin concentrates in this annular area, creating stresses capable of leaving an annular, or partially annular, gap region within or around the volume of set epoxy resin. Additionally, in some cases, applicants have observed that in the volume of setting epoxy, a thin, set, layer can form along the outer surface thereof in contact with the higher heat transfer material such as the casing, and thus an annular area which is still fluid can remain between this set and solidified portion and the central set and solidified portion. In this case, cracking and voids will form in this final fluid area after it also sets and solidifies.

The addition of solid particulate materials to reduce these stresses requires solids with thermal properties complementary to those of epoxy. Preferably, a material added to the epoxy fluid mixture must be compatible with the epoxy ingredients and not interfere with the resin-hardener reaction which is fundamental to setting, and thus hardening, the epoxy, and have at least one of a higher heat capacity, a higher thermal conductivity, or a lower coefficient of thermal expansion than the epoxy fluid mixture into which it is added. More preferably, the added solid material should have two, or all three, of these thermal properties. For example, applicants have determined that hematite, a common oilfield weighting agent, has higher heat capacity, higher thermal conductivity, and lower coefficient of thermal expansion than solid epoxy. Therefore, a composite sealant containing epoxy and hematite will lower the exothermic temperature increase and lower the total contraction of the resulting set epoxy-solids composite after cooling. Examination of the thermal properties of other potential materials in particulate solid form set forth in Table 1 reveals several materials with one or two highly complementary thermal properties compared to sealing epoxy which also do not impact the epoxy resin-hardener reaction, and thus may be employed in an epoxy based well sealant mixture.

For example, graphite possesses an extremely high thermal conductivity and an extremely low coefficient of thermal expansion as compared to the epoxy sealant. Manganese oxide has a high heat capacity as compared to the epoxy sealant. Aluminum oxide has a high heat capacity and a low coefficient of thermal expansion as compared to the epoxy sealant.

TABLE 1

Thermal properties of epoxy resin compared to various solid weighting agents or diluents (water and air properties are provided for comparison).

| Material | Abbr. | Density (kg/m$^3$) | Thermal Conductivity (W/m ° K) | Volumetric Heat Capacity (MJ/m$^3$K) | CTE (μ in/ in ° K) |
|---|---|---|---|---|---|
| Epoxy Resin Solid | SEP | 1000 | 0.35 | 1.00 | 54.0 |
| Epoxy Resin Liquid | EP | 1000 | 0.35 | 2.09 | 54.0 |
| Steel | SS | 8000 | 43.00 | 15.07 | 12.1 |
| Cement | CMT | 2000 | 0.29 | 3.10 | 10.8 |
| Sand | SND | 2500 | 0.25 | 1.99 | 1.1 |
| Graphite | G | 2000 | 200.00 | 1.42 | 4.0 |
| Manganese oxide | MnO | 4600 | 4.10 | 7.70 | 39.1 |
| Aluminum Oxide | AlO | 2400 | 30.00 | 3.17 | 8.1 |
| Barium Sulfate | Brt | 4230 | 1.67 | 1.95 | 20.5 |
| Hematite | Hem | 5200 | 12.55 | 7.50 | 12.2 |
| Silicon Carbide | SiC | 3200 | 120.00 | 2.01 | 2.8 |
| Aluminum Nitride | AlN | 3260 | 165.00 | 2.46 | 19.1 |
| Air | AIR | 1.225 | 0.02 | 1.00 | 3400.0 |
| Water | H2O | 1000 | 0.60 | 4.19 | 21.4 |

The combination of tailoring the particulate solids particle size distribution to induce solids settling, and proportioning the sealant component materials to emphasize composite thermal property effects, results in a composite sealant with satisfactory thermal properties, density, viscosity, handling time, setting time, mechanical properties, high solids concentration in the solids-rich portion, and seal effectiveness for low-temperature, large-volume petroleum well applications.

A composite epoxy sealant containing a blend of solids selected to maximize the sealant's thermal conductivity and heat capacity while minimizing CTE improves sealant bonding in low-temperature applications that require large sealant volumes, placed in sealing configurations where the sealant plug has a low surface area to volume ratio. However, there is an upper limit on the concentration of solids which can be incorporated into a fluid epoxy composition which will still be sufficiently fluid to be placed into the well by pumping through standard oilfield tubulars. The upper limit on the concentration of solids relatively uniformly mixed and distributed within a fluid epoxy is a function of the particle size distribution and surface wettability characteristics of the solids. The practical upper limit for solids concentration to produce a pumpable fluid slurry is around 30% by volume of the epoxy-solids composite. The maximum concentration of the solids is a function primarily of the surface area of the solids, and thus, smaller sized solids, which in aggregate, have a larger surface area than an equivalent volume of larger sized solids, can be incorporated into the epoxy-solids composite to a lower solids concentration upper limit than can larger sized solids.

An epoxy-based composite sealant that is mixable with, and can be placed using, standard oilfield methods and equipment and then segregate to yield a substantial volume of composite sealant with a solid(s) content in excess of that in a pumpable non-settling sealant slurry provides superior sealing performance as a seal plug, and during hardening from a fluid to a solid state. Benefits of the engineered self-segregating epoxy composite over placing a stable, pumpable epoxy or epoxy-solids composite include:

Increased heat capacity
Increased thermal conductivity
Lower CTE
Lower exothermic heat generation.

As a result, a better-bonded, more internally robust, sealant plug forming a more durable barrier in a well can be created in situ.

Formulation of an epoxy-solids composite to produce a durable well seal for low-temperature, large-volume applications involves first assessing the sealant application conditions, well geometry, and also determining the epoxy-solids composite slurry properties required for placement at the sealing location in the well (rheology, density, handling time, set time). Then, the kinetics of epoxy curing is evaluated to assess the extent of the thermal gradient the sealant will experience between the center and outer surface thereof. Finally, six thermomechanical performance parameters of the epoxy-solids composite are optimized within the constraints of well conditions, sealant design, and sealant placement requirements. These performance parameters are:

Bond development factor
Thermal expansion factor
Exothermic factor
Heat flow factor
Heat duration factor
Set time/cool down factor A sealant performance correlation based on the six factors listed above relates the timing of heat generated by the resin-hardener reaction and dissipated from the sealant into the adjacent formation to the likelihood of the sealant bonding to the outer steel wall of the casing where the epoxy-solids composite sealing plug is to be placed. This correlation provides a realistic metric of a particular sealant formulation's chance of success in forming a well barrier, i.e., to effectively seal the well (Bond Correlation).

Each of these performance parameters and correlations are described below.

1. Bond Development Factor

The time at which bond strength is first noted in a volume of fluid, and setting, epoxy is critical to seal effectiveness. Ideally, internal bonding in the epoxy will not develop until after the temperature increase driven by the exothermic resin-hardener reaction has been reduced. Therefore, early bond strength development occurring after dissipation of the heat of reaction into the well bore ambient will result in less stress on the epoxy-casing bond and a greater chance of maintaining a seal in the well. Quantifying this value for epoxy-solid composites is critical to sealant design and the success of the sealant application.

An easy way to measure the setting profile of an epoxy is by using a penetration test. Below in Table 2 is the description of the penetration test criteria that we have developed, which is based on pressing a ⅛ inch diameter plastic rod against a volume of sealant, and the result of that pressing, i.e., whether the rod penetrates into the volume of sealant, and related properties.

TABLE 2

Penetration Test for Resin with ⅛" plastic rod

| Value | Physical condition of the epoxy-solid composite |
|---|---|
| P1 | A Viscous fluid |
| P2 | A Highly Gelled Semi-Solid |
| P3 | A Stiff Semi-Solid, which is Easily Penetrated but epoxy adheres to the rod |

TABLE 2-continued

Penetration Test for Resin with ⅛" plastic rod

| Value | Physical condition of the epoxy-solid composite |
|---|---|
| P4 | An Elastic Solid, Easily Deformed/Penetrated by the rod, but the epoxy does not adhere to Rod |
| P5 | An Elastic Solid, where the Rod is Able to deform the top of the epoxy, but the rod does not penetrate the resin |
| P6 | A Hard Solid, and the Rod is Unable to deform the top of the Epoxy |

Table 3, below, illustrates the significance of the bond development factor. The shear bond was measured on several epoxy samples as they were setting, using the shear bond test detailed later herein, and the results correlated to the penetration tests as is shown in table 3. When a shear bond has formed, the epoxy has adhered to the surrounding enclosure, for example the wall of a test vessel or the casing. The shear bond value verses the penetration test value indicated that the shear bonds begin to develop when the penetration test value is a "P4". This is significant, as the expansion and contraction of the resin due to temperature changes must be complete or nearly complete prior to a shear bond forming in the epoxy to minimize the detrimental effects of temperature change on the sealing properties of the epoxy-solid composite. Thus, a bond development factor of P4- to P6, occurring after the maximum temperature of the setting epoxy-solids composite has been reached, is preferred. The correlation of the forming of the shear bond based on the shear bond test with the P value of the penetration test allows for the use of the penetration test during testing of epoxy-solids composites as a substitute for the shear bond test.

TABLE 3

Shear Bond Development for Various Penetration Test Values

| Test | Shear Bond (psi) - Penetration Reading P3 | Shear Bond (psi) - enetration Reading P4 | Shear Bond (psi) - Penetration Reading of P5 |
|---|---|---|---|
| 1 | 0 | 24.0 | 187 |
| 2 | 0 | 10.0 | 53 |
| 3 | 0 | 16.0 | 93 |
| 4 | 0 | 8.5 | 219 |
| 5 | 0 | 7.0 | 35 |

2. Thermal Expansion Factor

Methods for formulating epoxy-solid composites for well sealing applications must account for the difference between the CTE of the epoxy-solid composite compared to that of steel, the material with which epoxy must bond in most well sealing applications. The addition of materials to reduce the CTE of an epoxy-solids composite to that of steel, or to approach it, increases the potential for maintaining sealing contact between the epoxy-solid composite and the steel of a well casing as the sealing composite and the steel cool down after the maximum temperature caused by the resin-hardener reaction has been reached. Particulate solid materials with low CTE are blended with the epoxy, preferably with the resin before the hardener is intermixed therewith, so that the resulting CTE of the composite material is less than that of the epoxy itself. The particulates not only dilute the resin volume of the epoxy-solid composite per unit volume by reducing the volume of reactive components per cubic foot or cubic meter of sealant, they also lower the CTE of the resulting composite sealant material compared to that of the epoxy component thereof.

Table 4 below details the CTE of epoxy composites with various loadings of solids by total design volume (solids volume fraction, or SVF). The composite CTE can be approximated by the following equation:

$$CTE_c = CTE_r * VF_r + CTE_{p1} * VF_{p1} + CTE_{p2} * VF_{p2}$$

Where:
$CTE_c$ is the composite Coefficient of Thermal Expansion
$CTE_r$ is the Coefficient of Thermal Expansion for the resin
$CTE_{p1}$ is the Coefficient of Thermal Expansion for particulate type 1
$CTE_{p2}$ is the Coefficient of Thermal Expansion for particulate type 2
$VF_r$ is the volume fraction of the resin
$VF_{p1}$ is the volume fraction of the particulate type 1
$VF_{p2}$ is the volume fraction of the particulate type 2

TABLE 4

Summary of Composite Epoxy Resin CTE for various SVF % of Solids

| | $CTE_c$ (μ in/in ° K) | | |
|---|---|---|---|
| Solid Type | 20% SVF | 30% SVF | 40% SVF |
| EP (No Solids) | 54.0 | 54.0 | 54.0 |
| MnO | 51.0 | 49.5 | 48.0 |
| Brt | 47.3 | 44.0 | 40.6 |
| SiC | 43.8 | 38.6 | 33.5 |
| G | 44.0 | 39.0 | 34.0 |

Minimizing the Thermal Expansion Factor (TEF), calculated as the difference between the CTE of the resin composite and the CTE of steel, multiplied by the maximum temperature observed in specific geometries divided by 250° F. [$(CTE_c - CTE_S) * T_{max}/250°$ F.], reduces the stresses induced in the matrix of the resin and on the bond formed between the resin and steel during cooling of the epoxy-solid composite from the elevated temperature caused by the exothermic resin-hardener reaction to the well ambient temperature. Presented in Table 5 below, are the maximum temperature ($T_{max}$) results for a variety of epoxy-solids composite sealant designs cured in specific geometry vessels. Using each designs' corresponding SVF %, the difference in CTE of the epoxy-solid composite and the CTE of steel was calculated and then used to compute the Thermal Expansion Factor, TEF. The TEF is preferably less than 45, and more preferably less than 30, for good control of the timing of shear bond formation with respect to the sealant temperature and the resulting seal integrity.

TABLE 5

Thermal Expansion Factor Data

| System | SVF % | Solid Type | $CTE_c$-$CTE_s$ (μ in/in K) | Well Geometry | Maximum Temperature (Tmax, ° F.) | TEF |
|---|---|---|---|---|---|---|
| 1 | 18 | MnO | 39 | 3 | 258 | 40.2 |
| 2 | 18 | MnO/G | 38 | 3 | 136 | 20.7 |
| 3 | 18 | MnO/G | 38 | 3 | 142 | 21.6 |
| 4 | 18 | MnO | 39 | 3 | 158 | 24.6 |
| 5 | 18 | MnO | 39 | 3 | 189 | 29.5 |
| 6 | 18 | MnO/G | 36 | 3 | 203 | 29.2 |
| 7 | 18 | MnO | 39 | 4 | 244 | 38.1 |
| 8 | 18 | MnO/G | 36 | 4 | 287 | 41.3 |

TABLE 5-continued

Thermal Expansion Factor Data

| System | SVF % | Solid Type | $CTE_c$-$CTE_s$ (μ in/in K) | Well Geometry | Maximum Temperature ($T_{max}$, °F.) | TEF |
|---|---|---|---|---|---|---|
| 9 | 18 | MnO/G | 36 | 4 | 162 | 23.3 |
| 10 | 18 | MnO/G | 36 | 4 | 284 | 40.9 |
| 11 | 18 | MnO/G | 36 | 4 | 236 | 34.0 |
| 12 | 32 | MnO/G | 33 | 1 | 85 | 11.2 |
|  | 32 | MnO/G | 33 | 3 | 229 | 30.2 |
| 13 | 20 | MnO | 39 | 1 | 85 | 13.3 |
|  | 20 | MnO | 39 | 2 | 115 | 17.9 |
|  | 20 | MnO | 39 | 3 | 220 | 35.2 |
| 14 | 15 | MnO | 40 | 1 | 100 | 16.0 |
|  | 15 | MnO | 40 | 2 | 135 | 23.5 |
| 15 | — | EP | 42 | 4 | 400 | 67.2 |

3. Exothermic Factor

The results of the mixing and setting of several examples of epoxy-solids compositions, which resulted in mitigating the exothermic reaction effects on the sealants, are shown in Table 6. The solid particulate(s) added to the base epoxy sealant fluid mixture were selected based upon their complimentary thermal properties with respect to the sealant, i.e., where the thermal property of interest in the sealant itself is high, one or more solid particulates having a low value of that same thermal property were added, and where the thermal property of interest in the sealant itself is low, one or more solid particulates having a high value of that same thermal property were added. The base epoxy formulation for these tests was 100 parts epoxy resin, 30 parts reactive diluent, 30 parts high temperature hardener, 10 parts silane, and 3 parts hardener reaction accelerator, all by weight. An example of a Portland cement sealant, system 6, with no additives, was also tested. The base Portland cement composition was API Class H cement mixed with 4.3 gal/sk (gallons per 94 lb sack) water. All of these sealant formulations are designed to be stable fluids that set at 70° F. in an appropriate time frame, i.e., the designed-in time before the sealant sets was as long as, or longer than, the time needed to thoroughly mix the formulation, pump it to the sealing location in the well, and allow solids therein to settle from an upper region to a lower region thereof. Herein, the setting time of the sealant in situ, sufficient to allow the solids to settle or migrate sufficiently to segregate the sealing material into an upper solids depleted region and a lower solids rich or solids enhanced region, is one hour before a bond development factor greater than P1 occurs. Additionally, the sealants are designed to be mixable in fluid form, and pumpable to the well sealing location, or to the open casing at or slightly above the seafloor, with standard oilfield equipment. Testing consisted of mixing 4 gallons of each sealant and pouring it into a 5-gallon metal bucket (about 2 feet high having a diameter of 12") with a thermocouple extending through the bucket wall at the fluid's height midpoint in the bucket and extending 2 inches into the bucket from the inner wall thereof. The buckets having the sealant composition mixtures therein were held at room temperature (70° F.) while the sealant compositions set. The temperature of the sealant compositions were monitored throughout the setting time period. The maximum temperature and the time of occurrence thereof are reported in Table 6.

The results of these tests demonstrate that increased volumes of solid particulates resulting in the same volume of a sealant-solid composition (here 4 gallons) substantially reduced the maximum reaction temperature reached by the sealant-solid compositions as compared to a same volume of base sealant without these solid additives. The most dramatic temperature reduction resulted from the addition of a combination of graphite and manganese oxide (system 4).

It is important to note that there is a limit to the amount of solids that can be added to an epoxy volume due to excess viscosity of the resulting epoxy-solids composite. The limit of mixing these solids in the different sealant systems is also provided in table 6.

TABLE 6

Change in Temperature vs. Time of Epoxy Compositions in metal bucket in Air ambient

| System | SVF % | Solids Type | Max Temp ($T_{max}$, °F.) | Time to $T_{max}$ ($t_{max}$, hr:min) | Max Solids Mixable, SVF % |
|---|---|---|---|---|---|
| 16 | 0 | None | 237 | 18:06 | NA |
| 17 | 15 | MnO | 249 | 9:34 | 18 |
| 18 | 38 | 80% Silica/20% MnO | 150 | 14:57 | 35 |
| 19 | 30 | 90% G/10% MnO | 101 | 1:37 | 21 |
| 20 | 18 | CMT/~20 lb/sk G | 134 | 5:31 | 25 |
| 21 | 0 | CMT | 142 | 8:20 | NA |

Table 7 provides the results of twenty adiabatic temperature rise tests performed at room temperature using a standard base epoxy formulation loaded with varying volumes of distinct solid materials. Each sealant design was mixed and placed in an insulated vacuum bottle, which creates close to adiabatic conditions. The resulting temperature increase resulting from the exothermic setting reaction with respect to time was recorded. The table specifies the type of solid material added, the percent by volume of the solid to the total volume of the epoxy-solid composite mix, the maximum adiabatic temperature (Ta,max) achieved during the test and finally an Exothermic Factor (ETF). This factor is the ratio of the maximum adiabatic temperature observed in the test divided by 250° F. [(Ta,max)/250° F.]. The ETF value should be less than 1.1 and preferably under 0.8. The values for Portland cement are included for comparison purposes.

TABLE 7

Adiabatic Temperature of Composite Resins with various Solid Material additions

| Solids Type | SVF % | MaxTemp ($T_{a,max}$, °F.) | ETF |
|---|---|---|---|
| MnO (14) | 15 | 250 | 1.00 |
| MnO (13) | 20 | 240 | 0.96 |
| MnO | 25 | 230 | 0.92 |
| MnO | 30 | 220 | 0.88 |
| MnO | 35 | 200 | 0.80 |
| AlO | 20 | 242 | 0.92 |
| AlO | 25 | 238 | 0.95 |
| AlO | 30 | 210 | 0.84 |
| AlO | 35 | 190 | 0.76 |
| SiC | 20 | 250 | 1.0 |
| SiC | 25 | 245 | 0.98 |
| SiC | 30 | 225 | 0.90 |
| SiC | 35 | 220 | 0.88 |
| SiC | 40 | 190 | 0.76 |
| SiC | 50 | 162 | 0.65 |
| G | 20 | 290 | 1.16 |
| G | 25 | 270 | 1.08 |
| G | 30 | 252 | 1.00 |

TABLE 7-continued

Adiabatic Temperature of Composite Resins with various Solid Material additions

| Solids Type | SVF % | MaxTemp ($T_{a,max}$, ° F.) | ETF |
|---|---|---|---|
| G | 35 | 248 | 1.00 |
| G | 40 | 222 | 0.89 |
| G | 50 | 172 | 0.69 |
| MnO/G (12)* | 32 | 235 | 0.94 |
| SND | 20 | 260 | 1.04 |
| Brt | 28 | 250 | 1.00 |
| CMT | 28 | 238 | 0.95 |

*Weighted average calculated using the maximum temperature for each weighting material times the % volume proportion of material in composite In the following Table 8, details of various solids-free epoxy formulas and their corresponding maximum adiabatic temperature are shown. The data confirms the maximum temperature of the epoxy reached as a result of the exothermic reaction can be controlled by varying the diluent and hardener concentrations with respect to the overall volume of the epoxy formulation. Additionally, the Exothermic Factor has been calculated. Changing the diluent volume loading changed the maximum adiabatic temperature and ETF significantly. The ETF can be changed from 1.4 down to 1.0 with just the addition of diluent. Also, the combined loading modification of hardeners along with diluents can alter the maximum temperature and ETF value (see test 23, 25 and 26). The diluents are fluids which react with the hardeners but have low viscosity in order to thin the resin and thereby reduce the viscosity of the composite mixture thereof.

TABLE 8

Adiabatic Temperature of Resins with various Diluent and Hardener additions

| System | Vol % Diluent | Vol % Low Temperature Hardener (LTH) | Maximum Temperature ($T_{a,max}$, ° F.) | ETF |
|---|---|---|---|---|
| 15 | 15 | 32.5 | 343 | 1.4 |
| 22 | 20 | 35 | 345 | 1.4 |
| 23 | 30 | 35 | 310 | 1.2 |
| 24 | 40 | 35 | 265 | 1.1 |
| 25 | 45 | 35 | 245 | 1.0 |
| 26 | 40 | 40 | 320 | 1.3 |
| 27 | 40 | 50 | 350 | 1.4 |
| 28 | 50 | 40 | 260 | 1.0 |

4. Heat Flow Factor

Quantifying the thermal conductivity, heat capacity, and the extent of the exothermic resin-hardener reaction and associated heat generated in view of the well geometry and sealant mass is necessary to a ensure reasonable curing time of the epoxy-solids composite, balanced with adequate bond strength of the epoxy-solids composite. Comparing the exothermic factor ($T_{a,max}/250°$ F. under adiabatic conditions) and the heat flow factor ($D_e^{1/3}/K$) reveals the thermal energy the sealant will generate in comparison to the sealant's ability to conduct the thermal energy to its surroundings. Minimizing each factor individually will improve the sealant's effectiveness in the application. A lower change in the temperature ($\Delta T$) indicates increased heat capacity and dilution of the composite while formulations having lower heat flow factors have a lower temperature gradient between the center of mass to the outer boundary of the volume of epoxy-solid composite resulting in reduced temperatures at the outer boundary of the volume of epoxy-solid composite because of the lower ambient temperature at the wall. Note in Table 10 the increase in HFF corresponding to the reduction of Composite Thermal Conductivity (K) thermal conductivity (k) of the composite resin and/or the increase of effective diameter of the sealant volume as a result of different test vessel geometries. The desired range for HFF is <5.5.

Various diameters of casing and piping are disclosed herein, and used in the tests for some of the six performance factors hereof. Table 9 provides the actual inner diameters of four different typical well configurations.

TABLE 9

Effective Diameter of various Geometries of well piping or casing

| Well Geometry/ Configurations | Pipe/Annulus | D effective (in) |
|---|---|---|
| 1 | 2" Schedule 40 Black Pipe | 2.067 |
| 2 | 9⅝", 47# × 4½", 15.1# | 4.181 |
| 3 | 13⅜", 72# | 12.347 |
| 4 | 18⅜", 87# | 17.755 |

TABLE 10

Heat Flow Factor of Resin Systems with various Thermal K values and Geometries

| System | Solid Type | SVF (%) | Thermal Conductivity (W/m ° K) | Heat Flow Factor $D_e =$ 2.07" | $D_e =$ 4.18" | $D_e =$ 12.35" | $D_e =$ 17.76" |
|---|---|---|---|---|---|---|---|
| 1 | G | 46 | 2.62 | 0.5 | 0.6 | 0.9 | 1.0 |
| 29 | SiC | 34 | 1.51 | 0.8 | 1.1 | 1.5 | 1.7 |
| 30 | G | 29 | 1.31 | 1.0 | 1.2 | 1.8 | 2.0 |
| 31 | G | 23 | 1.01 | 1.3 | 1.6 | 2.3 | 2.6 |
| 32 | MnO/G/SND | 33 | 0.96 | 1.3 | 1.7 | 2.4 | 2.7 |
| 12 | MnO/G | 32 | 0.58 | 2.2 | 2.8 | 4.0 | 4.5 |
| 13 | MnO | 20 | 0.40 | 3.2 | 4.0 | 5.8 | 6.5 |
| 14 | Manganese Tetra Oxide | 15 | 0.30 | 4.3 | 5.4 | 7.7 | 8.7 |

TABLE 10-continued

Heat Flow Factor of Resin Systems with various Thermal K values and Geometries

| System | Solid Type | SVF (%) | Thermal Conductivity (W/m °K) | Heat Flow Factor | | | |
|---|---|---|---|---|---|---|---|
| | | | | $D_e = 2.07''$ | $D_e = 4.18''$ | $D_e = 12.35''$ | $D_e = 17.76''$ |
| 15 | Neat | — | 0.27 | 4.7 | 6.0 | 8.6 | 9.7 |
| 33 | Neat | — | 0.23 | 5.4 | 6.9 | 9.9 | 11.1 |

5. Heat Duration factor

An additional benefit of increased thermal conductivity specific to epoxy sealants is a more linear thermal gradient from the epoxy center of mass to the outer surface or boundary of the volume of epoxy. Without thermal property modifying particulate solids, epoxy is insulating, and the heat generated by the resin-hardener reaction is retained throughout most of the volume thereof during the resin-hardener reaction and for a long time period thereafter. The temperature near the boundary of the volume of epoxy drops off to that of, or close to that of, the surrounding material. With this temperature distribution, most of the epoxy volume expands and then hardens. The very small volume of epoxy around the perimeter of the hardened part remains fluid because the reaction of the resin and hardener is temperature dependent, and this portion of the epoxy is cooler, and thus less reactive than, the remainder thereof. As this small volume of fluid around the perimeter sets and cools, it can contract away from the casing surrounding the sealant leaving a gap that disrupts the desired seal. A more linear temperature distribution within a large volume of resin containing solid particulate material with appropriately-designed thermal properties allows more gradual hardening from the center of the volume of epoxy and then outwardly therefrom. Thus, larger volumes of the epoxy resin remain in the fluid state as the material sets and cools. This permits bond formation to the perimeter to incorporate a larger fluid volume with more evenly distributed stresses upon cooling. The gaps resulting from the thin epoxy films' contraction are eliminated. Additionally, any fluid pressure exerted on the epoxy mass from above is freely transmitted through the epoxy to the well below as the epoxy sets in a more uniform progression. This pressure maintenance minimizes well fluid migration through the setting epoxy thereby improving seal formation. The table below shows a summary of data that was collected on different seal geometries with different epoxy-solids composite compositions with different solids in the epoxy-solid composite. The table shows the test performed including the diameters of the seal, and the epoxy composition including the resin, diluent, hardener and solids by % by volume. The type of solids used is also provided. All systems were cured in five gallon buckets, as described above, in air unless otherwise noted. In the tests, the maximum temperature that was achieved in the test in the middle of the sample is provided. Additionally, the time from the start of the test until the maximum temperature is reached in the middle of the sample is also presented. The Heat Duration Factor is calculated (HDF). This value is the Maximum Temperature reached after mixing and allowed to set static as a mass, divided by the time to reach the maximum temperature. This HDF factor is the rate at which the composite resin system heated up. The lower this value, e.g., the slower this the epoxy-solids composite reaches its maximum temperature, the better, as the maximum temperature is thus more likely to be reached before significant hardening of the fluid epoxy-solids composite has occurred. Herein, where the HDF is 55 or less, the epoxy-solids composite is likely to reach maximum temperature while still in a fluid state, i.e., having a bond development factor of P3 or less.

The heat duration factor, as shown in Table 11, is useful in the design of a successful seal application which includes formulating, i.e., designing, an epoxy-solids composite with a low thermal gradient between its center of mass and the outer peripheral surface thereof. Minimizing the heat duration factor (isothermal $T_{max}/t_{max}$) for the exothermic reaction reduces the temperature gradient to which the curing epoxy will be subjected. The rate of temperature increase in epoxies cured in isothermal conditions is a function of reaction kinetics, composite heat capacity, and composite thermal conductivity. Controlling hardener type and concentration thereof as well as the addition of particulate solids to raise the specific heat and thermal conductivity can be combined to reduce the heat duration factor.

TABLE 11

Heat Duration Factor Data

| System | Vessel | Diluent (% bwor) | Hardener (% bwor) | SVF % | Solid Type and relative % of solids by volume | Max Temp ($T_{max}$, °F.) | Time to $T_{max}$ ($t_{max}$, hr:mn) | HDF |
|---|---|---|---|---|---|---|---|---|
| 1 | 3 | 10 | 30 | 18.4 | MnO | 258 | 3:35 | 72 |
| 2 | 3 | 20 | 25 | 18.4 | 75/25 MnO/G | 136 | 5:36 | 24 |
| 3 | 3 | 25 | 25 | 18.4 | 75/25 MnO/G | 142 | 4:31 | 31 |
| 4 | 3 | 25 | 25 | 18.4 | MnO | 158 | 4:19 | 37 |
| 5 | 3 | 20 | 27.5 | 18.4 | MnO | 189 | 5:22 | 35 |
| 6 | 3 | 20 | 32.5 | 18.4 | 50/50 MnO/G | 203 | 4:56 | 41 |

TABLE 11-continued

Heat Duration Factor Data

| System | Vessel | Diluent (% bwor) | Hardener (% bwor) | SVF % | Solid Type and relative % of solids by volume | Max Temp ($T_{max}$, °F.) | Time to $T_{max}$ ($t_{max}$, hr:mn) | HDF |
|---|---|---|---|---|---|---|---|---|
| 7 | 4 | 20 | 30 | 18.4 | MnO | 244 | 6:12 | 39 |
| 8 | 4 | 20 | 35 | 18.4 | 50/50 MnO/G | 287 | 5:25 | 53 |
| 9 | 4 | 20 | 20 | 18.4 | 50/50 MnO/G | 162 | 9:46 | 17 |
| 10 | 4 | 30 | 40 | 18.4 | 50/50 MnO/G | 284 | 4:10 | 68 |
| 11* | 4 | 25 | 25 | 18.4 | 50/50 MnO/G | 236 | 6:04 | 39 |
| 12 | 1 | 20 | 35 | 32.0 | 50/50 MnO/G | 85 | 6:00 | 14 |
|  | 3 | 20 | 35 | 32.0 | 50/50 MnO/G | 229 | 4:15 | 54 |
| 13 | 1 | 20 | 30 | 32.0 | MnO | 84 | 8:00 | 11 |
|  | 2 | 20 | 30 | 20.4 | MnO | 121 | 5:03 | 24 |
|  | 3 | 20 | 30 | 20.4 | MnO | 220 | 4:32 | 49 |
| 14 | 1 | 10 | 30 | 14.5 | MnO | 100 | 3:45 | 27 |
|  | 2 | 10 | 30 | 14.5 | MnO | 145 | 4:00 | 36 |
| 15 | 1 | 15 | 32.5 | — | — | 114 | 3:54 | 29 |
|  | 4 | 15 | 32.5 | — | — | 400 | 11:48 | 34 |

*Pail was surrounded by sand while curing.

6. Set Time, Cool Down Factor

The time at which the epoxy mechanically bonds to the internal wall of the casing, compared to the time when the heat generated from the epoxy-solid composite in the exothermic setting reaction is dissipated therefrom is herein the set time factor. The time when the bond is initially formed compared to the time to when the epoxy seal reaches temperature equilibrium with the adjacent ambient after the exothermic resin-hardener reaction is completed, provides a good indicator of heat transfer, reaction kinetics and stresses imposed during bond formation. Table 12 provides tabulated results of this set time cool down factor (STF). The epoxy system, i.e., the epoxy-solids composite, is provided for reference as is necessary data to calculate the STF. The time that the epoxy-solids composite took to cool down from the maximum temperature to 100 F and 80 F is provided along with the time for the epoxy-solids composite to reach a penetration test value of P4 and P5 adjacent to the wall of the metal test vessel. The corresponding value of STF is calculated for all of the epoxy-solids composites. The STF is calculated as follows: The total time from initial mixing and placed in static mass to the composite reaching of ambient temperature in F plus 20 F divided by the time to reach P4 in hours ($t_{am+20F}/t_{p4}$). This ratio is provided in the STF column. To provide a satisfactory seal, this value needs to be <1.0.

TABLE 12

Set Time, Cool Down Factor

| System | Vessel | Solid Type (% of solids) | HDF | Time to <20° F. of Ambient ($t_{am+20 F.}$, hr:min) | Time to Ambient ($t_{am}$, hr:min) | Time to P4 ($t_{p4}$, hrs) | Time to P5 ($t_{p5}$, hrs) | STF |
|---|---|---|---|---|---|---|---|---|
| 1 | 3 | MnO | 72 | 17:04 | 22:52 | 5 | 6 | 4.3 |
| 2 | 3 | 75/25 MnO/G | 24 | 13:42 | 21:35 | 108 | >168 | 0.3 |
| 3 | 3 | 75/25 MnO/G | 31 | 13:45 | 21:13 | 131 | >168 | 0.3 |
| 4 | 3 | MnO | 37 | 14:31 | 22:15 | 132 | >168 | 0.5 |
| 5 | 3 | MnO | 35 | 17:41 | 26:32 | 48 | 74 | 0.4 |
| 6 | 3 | 50/50 MnO/G | 41 | 14:30 | 21:35 | 24 | 74 | 0.5 |
| 7 | 4 | MnO | 39 | 32:46 | 43:00 | 18 | 85 | 0.7 |
| 8 | 4 | 50/50 MnO/G | 53 | 25:50 | 33:55 | 18 | 64 | 0.5 |
| 9 | 4 | 50/50 MnO/G | 17 | 26:31 | 37:47 | 129 | >139 | 0.9 |
| 10 | 4 | 50/50 MnO/G | 68 | 23:42 | 32:07 | 17 | 45.5 | 0.6 |
| 11 | 4 | 50/50 MnO/G | 39 | 31:47 | 43:15 | 17 | 54.5 | 0.7 |
| 12 | 1 | 50/50 MnO/G | 14 | 8:33 | 9:17 | 22.5 | 78 | 0.1 |

TABLE 12-continued

Set Time, Cool Down Factor

| System | Vessel | Solid Type (% of solids) | HDF | Time to <20° F. of Ambient ($t_{am+20\ F.}$, hr:min) | Time to Ambient ($t_{am}$, hr:min) | Time to P4 ($t_{p4}$, hrs) | Time to P5 ($t_{p5}$, hrs) | STF |
|---|---|---|---|---|---|---|---|---|
|  | 3 | 50/50 MnO/G | 54 | 13:47 | 19:47 | 18.5 | 74 | 0.3 |
| 13 | 1 | MnO | 11 | 6:43 | 7:22 | 27 | 79 | 0.1 |
|  | 2 | MnO | 24 | 8:35 | 13:05 | 20 | 70 | 0.4 |
|  | 3 | MnO | 49 | 17:41 | 24:32 | 8 | 12 | 0.4 |
| 14 | 1 | MnO | 27 | 9:46 | 12:17 | 23 | 72 | 0.4 |
|  | 2 | MnO | 36 | 11:55 | 13:05 | 40.5 | 112.5 | 0.3 |
| 15 | 1 | — | 29 | 7:54 | 14:41 | 19 | 63 | 0.4 |
|  | 4 | — | 34 | 61:24 | 72:07 | 15.5 | 45 | 4.0 |

As set forth below, in summary, provided herein are 6 epoxy-solids composite performance criteria, that when satisfied will accurately estimate the in-situ thermal properties and reaction kinetics behavior of the epoxy-solids composite to produce a durable well seal comprised of an engineered composite epoxy-solids sealant. The composite is engineered from a resin based epoxy with the addition of solid particulate materials that improve thermal properties. The 6 performance criteria provided herein, and the acceptable and preferred values for each criteria, are set forth in Table 13 below.

TABLE 13

Acceptance Range for each Performance Criteria

| Description | Formula | Abbreviation | Max Range | Narrow Range | Preferred Range |
|---|---|---|---|---|---|
| Bond Development Factor | All Factors < or = to Max Range Value | BDC | Good resin composite design achieved when all performance factors within acceptable values. | | |
| Thermal Expansion Factor | ($CTE_R$ − $CTE_S$) * $T_{max}$/250° F. | TEF | <45 | <35 | <25 |
| Exothermic Factor | $T_{a,max}$/250° F. | EXF | <1.1 | <0.9 | <0.8 |
| Heat Flow Factor | $D_e^{1/3}/K$ | HFF | <5.5 | <4.5 | <3.0 |
| Heat Duration Factor | $T_{max}/t_{max}$ | HDF | <55 | <40 | <35 |
| Set time/ Cool down factor | $t_{am+20F}/t_{p4}$ | STF | <1.0 | <0.85 | <0.8 |

When all 6 of the above described and detailed performance criteria are satisfied, the design of a resin sealant with appropriate thermal properties, reaction kinetics, and strength development profile has been achieved. Good bond to surrounding metal was confirmed by observation of bonding within the epoxy seal and the boundary with the metal container and/or a physical shear or hydraulic bond test. The following Table 14 details the performance criteria results for each factor in tabular form. The bond correlation was accurate in predicting an effective seal.

TABLE 14

Summary of Factor Result Data

| Test | Well Config. | TEF | EXF | HFF | HDF | STF | Bond Ob | Bond Tested |
|---|---|---|---|---|---|---|---|---|
| 1 | 3 | Y | Y | Y | N | N | N | — |
| 7 | 4 | Y | Y | N | Y | N | N | — |
| Base | 3 | N | Y | Y | N | Y | N | — |
| Base HD MM | 3 | Y | Y | N | Y | Y | N | — |
| 9 | 4 | Y | Y | Y | Y | Y | Y | — |
| MU | 4 | Y | Y | N | Y | N | N | — |
| 8 | 4 | Y | Y | N | N | N | N | — |
| HT Bar | 3 | N | Y | N | Y | N | N | — |
| HT MM | 3 | Y | Y | Y | Y | Y | Y | — |
| Mu SiC 20% | 2 | Y | Y | Y | Y | Y | Y | — |
| Mu Sic 20% | 2 | Y | Y | Y | Y | N | N | — |
| 2 | 3 | Y | Y | Y | Y | Y | Y | — |
| 3 | 3 | Y | Y | Y | Y | Y | Y | — |
| 4 | 3 | Y | Y | Y | Y | Y | Y | — |
| 5 | 3 | Y | Y | Y | Y | Y | Y | — |
| 6 | 3 | Y | Y | Y | Y | Y | Y | — |
| FW-18-13 | 4 | Y | Y | Y | Y | Y | Y | — |
| 12 | 1 | Y | Y | Y | Y | Y | Y | Y |
|  | 3 | Y | Y | Y | Y | Y | Y | Y |
| 13 | 1 | Y | Y | Y | Y | Y | Y | Y |
|  | 2 | Y | Y | Y | Y | Y | Y | Y |
|  | 3 | Y | Y | N | Y | Y | N | N |
| 14 | 1 | Y | Y | Y | Y | Y | Y | Y |
|  | 2 | Y | Y | N | Y | N | N | N |
| 15 | 4 | N | Y | N | Y | N | N | N |

The above described properties of a sealing composite mixture that can form an acceptable seal in situ are based on testing of material properties of epoxy-solids composites where the solids do not significantly settle in-situ to form a solids rich and solids depleted region. The maximum concentration of solids that can be incorporated into an epoxy-solids composite sealing material is currently not limited by any inherent limit in the concentration of solid particulates that can be loaded into an epoxy resin, but by the resulting fluid properties of the resulting composite which limit the maximum concentration of solids in the composite before it can be pumped through standard oilfield equipment. This limits the concentration of solids in the composite to a value less than the maximum that can be incorporated into the epoxy resin. However, the enhancement of the sealant properties provided by adding solids are further enhanced where a seal is designed to include settling solids, as discussed herein, to form a solids enhanced seal volume, below a solids depleted sealant region, having a greater concentration of solids than can be incorporated into a pumpable composite having the same height (and for a given diameter casing, same volume) as a non-settling solids containing sealing plug. In this case, the solids depleted sealing material which is of necessity located over the solids enhanced volume, need not form a sealing plug. By maximizing the quantity of solids which can be introduced into the epoxy-solids composites as settleable solids, the solids enriched volume of the resulting seal will have a greater concentration of solids in it, after being located in situ, than can be placed therein and still produce a pumpable material.

As shown herein, properly chosen particulate solids intermixed with the resin of an epoxy reduce the magnitude of thermal stresses induced in an epoxy-solids composite sealant applied to a hydrocarbon well. A method of increasing particulate concentration beyond the limits of a pumpable slurry is to use particulates of appropriate particle size. Ideally, the upper, solids depleted portion of the sealing material would be free of solids, whereas the solids enhanced portion therebelow will receive all of the solids from the sealing material volume thereabove. Both portions of the epoxy sealant set, but the lower, solids-rich volume receives the solids from the volume above and this lower volume exhibits sealant designer controlled kinetics and exothermic reaction products and thereby forms a bond to well surfaces at an appropriate time during the setting reaction to ensure that a seal and a continuous sealing plug is actually formed therewith. Settling rates of the solids are chosen to produce a stable composite under the dynamic conditions of mixing and placement of the composite. Once the composite comes into a static state, i.e., at the sealing location, the solids in the upper portion settle into the lower volume sufficiently quickly to segregate from the upper portion before the resin becomes too viscous to allow them to move under the influence of gravity. Preferably, an epoxy design, i.e., formulation, is configured in view of the well sealing location, well ambient temperature, and the time needed to deliver the epoxy composite sealing material to the sealing location such that the epoxy constant maintains a bond development factor less than P1 for at least one hour at the sealing location of the well, to allow particulates therein to settle from and upper to a lower region thereof in situ.

In the following, the mixability, pumpability and static settling of a resin composite slurry is evaluated. A base epoxy resin formula consisting of 100 parts epoxy resin, 20 parts reactive diluent, 45 parts low temperature hardener, and 2 parts silane was used for evaluating mixability and dynamic settling, static shutdown settling, and static settling of silicon carbide and graphite particulate solids of various mesh sizes suspended in the slurry. Mixing begins with adding 100 parts epoxy resin, 20 parts reactive diluent, and 2 parts silane into a clear slurry cup, within which the mixing paddle is spun at 900 rpm±50 rpm using a tabletop mixer fitted with a 3 fin paddle. With the paddle rotating, a maximum amount of solid particulate material (solids) is added thereto over a 90 second period. A visual check of the resin composite slurry confirms no settling of the solids in the dynamic mixing environment. The low temperature hardener is then added to the spinning mixture and allowed to thoroughly mix therewith for 5 minutes. Again, a visual check of the resin composite slurry confirms no solids settling in the dynamic mixing environment. Next, the tabletop mixer intermixing the epoxy-solids composition is shut-down temporarily for a period of 5 minutes allowing the epoxy-solids composite mixture to become static. Following the static shutdown period, the length of time before the solids in the composite settle to leave an epoxy rich portion over the slid containing portion is recorded and compared to a set of criteria to determine if the slurry exhibits severe settling during a shutdown. Severe settling of the solids introduced into the epoxy during the mixing or blending operation can lead to failed sealant pumping operations due to clogged lines and pumping equipment. Surface wettability characteristics and particle size distribution govern the speed at which settling occurs. If more than ¼ of an inch of epoxy rich composite is visually observed over a solids incorporated portion, the formulation is considered to have severe settling. The settling is observed in a 600 ml volume of resin slurry mixed in a standard slurry cup for 5 min. Otherwise, the solids stay suspended sufficiently well in the composite to allow mixing and pumping of the formulation with conventional oilfield equipment.

Next, the epoxy-solids composite is re-blended for 60 seconds or until homogenous. Then 500 mls of the slurry is measured out and poured into a plugged marsh funnel with a modified tip opening of ½ in diameter. The plug is removed with the funnel tip facing directly downward, and the time for the epoxy-solids composite to exit the funnel is measured. The time in minutes per 1000 ml equivalent of composite is recorded, for example if 500 ml of composite takes 30 seconds to exit the funnel, then the 1000 ml equivalent is 60 seconds, and the result is evaluated against known fluid pumpability thresholds. If the time to exit the marsh funnel is less than 3.5 minutes then the slurry is considered pumpable.

Lastly, the homogenous, i.e., mixed epoxy-solids composite is poured into 250 ml graduated cylinders and allowed to cure at well conditions. Once cured, the density of the material is measured along the depth of the column of the set composite. The Density Variance in the set composite between the test samples taken near the top and bottom of the column, and the SVF % of the high solids portion of the composite, are calculated using the recorded density values. A sealant is classified as stable if the density variance is less than 10%. Samples of the composite taken from the lower ⅔rds of the column are evaluated for thermal properties.

A properly designed sealing composition of epoxy and solids will segregate into the two phases, one solids enhanced (or solids rich) and the other solids depleted, after placement in the sealing location in the well. The solids-enhanced portion has increased thermal conductivity to aid with heat transfer into the surrounding environment, increased heat capacity to store thermal energy with lessened temperature increase, and reduced CTE as compared to the solids depleted portion. All thermal property modifications are significantly improved in the solids-enhanced portion compared to those of a stable slurry.

Table 15, below, illustrates the effect of particle size distribution (PSD) on mixability and dynamic settling, static shutdown settling, and static settling of silicon carbide and graphite solids of various mesh sizes suspended in a base resin composition. Herein, a mesh size means a solid having a size capable of falling through a screen of a stated standard mesh spacing, but not through the mesh of a standard screen having a smaller standard mesh size. For example, 100 mesh solids means solids small enough to pass through a 100 mesh screen, but too large to fall through a 140 mesh screen. Results for both solid types evaluated demonstrate that the PSD of a single particulate material in resin will govern;

- whether severe initial static settling is observed (see M1 and M5);
- a slurries' ability to be pumped (see high marsh funnel time for M1); and the resulting thermal properties of the lower ⅔rds of the epoxy-solids composite in the well.

Thermal conductivity results for formulations M2 and M6 highlight the benefit of an optimally designed single solid type self-segregating resin slurry. Formulations M2 and M6 have thermal conductivity values 1.74 and 1.94 times higher than formulations M4 and M8, respectively.

TABLE 15

PSD effect on Initial and Final Settling

| Formulation | Solid Type | Mesh Size (D50) | Design SVF % | Initial Settling (Y/N) | % Density Variance (top to bottom) | High Solids Phase SVF % | Marsh Funnel (min:sec/1000 ml equivalent) | Thermal K (W/mK) |
|---|---|---|---|---|---|---|---|---|
| M1 | Silicon | 20 | 35 | Yes | 46.9 | 49.6 | 13:16 | NA |
| M2 | Carbide | 90 | 32 | No | 44.4 | 45.9 | 2:41 | 2.617 |
| M3 |  | 180 | 30 | No | 15.2 | 35.1 | 2:36 | 1.251 |
| M4 |  | 240 | 30 | No | 4.0 | 33.8 | 2:10 | 1.506 |
| M5 | Graphite | 14* | 35 | Yes | 15.5 | 46.5 | 1:31 | 2.087 |
| M6 |  | 40 | 24 | No | 16.8 | 34.6 | 1:01 | 1.956 |
| M7 |  | 150 | 25 | No | 1.2 | 28.6 | 1:03 | 1.305 |
| M8 |  | 400 | 19 | No | 0.01 | 22.6 | 1:49 | 1.006 |

Applicants have found that solids may be incorporated into the epoxy in fluid state at 22 to 30% by volume, depending on the size of the solids. Additionally, once the epoxy-solids composite is located at the sealing location, and the solids have settled, the solids enhanced portion has a considerably higher percentage of solids therein. For example, in an epoxy-solids composition having 30% solids upon mixing, in a 10 barrel volume of composite, there are 3 bbls of solids. Once this composite is located in the sealing location, and the solids settle, the solids can reach 40 to 55% by volume of the solids enhanced volume. Note that the packing density of the solids is dependent on the solids size and the distribution of sizes of the solids. Where the solids above have settled into the volume below such that the 3 bbls of solids are in 40% of the total volume of sealant delivered to the well, 3 bbls of solids and 4.5 bbls of resin comprise the settled portion. 7.5 bbls of solids enhanced epoxy composite are at the bottom of the column, and only 2.5 bbls of epoxy with no solids therein is over the top thereof. Thus, 75% of the sealant column is solids rich and 25% of the column has no solids. In the case where the solids can be packed to 55% by volume of the composite, 3 bbls of solids and 2.45 bbls of epoxy, or 5.45 bbls or 54% of the column has solids and 46% of the column has no solids.

Optimization of the thermal properties, density, viscosity, handling time, mechanical properties, solids concentration in the solids-enhanced portion of the column of sealing material, and sealing plug effectiveness for hydrocarbon well applications can be facilitated by combining solids with varying PSD's and thermal properties. Table 16 illustrates epoxy-solids composites using manganese oxide and either silicon carbide or graphite. An epoxy-solids composite loaded only with very fine (very small sized) manganese oxide has poor thermal properties and experiences little to no settling before the material becomes sufficiently viscous to prevent further settling of the solids. By adding a secondary solid particulate material and modifying the proportions of each particulate, in effect optimizing the PSD of the particulate system, a self-segregating resin composite system with improved thermal properties was achieved. An added benefit of the detailed dual solid resin composites is once static, the large particle size solids settle to the lower portion sufficiently quickly to fully segregate before the resin becomes too viscous to support them, while the fine particles remained suspended in the upper portion maintaining a density above 10.5 ppg. This phenomena is particularly useful in well applications were the existing well fluid has a density higher than the resin system in an unweighted (no particulate added) state. The upper portion of the resin column will remain at a density below the well fluid density and the resin will not migrate up through the heavier well fluid once the solids settle to the bottom. The column of resin will stay where it is placed in the well.

TABLE 16

| System | Design SVF % by Type of Solid | | | % Density Variance (top to bottom) | Thermal K. (W/mK) |
|---|---|---|---|---|---|
|  | Manganese oxide | Silicon Carbide | Graphite |  |  |
| SMM-1 | 3 | 22 | — | 43 | 2.2438 |
| SMM-2 | 5 | 20 | — | 40 | 2.2705 |
| SMM-3 | 7 | 18 | — | 37 | 0.607 |
| SMM-4 | 3 | — | 22 | 12 | 1.891 |
| SMM-5 | 5 | — | 20 | 9 | 0.223 |
| SMM-6 | 7 | — | 18 | 7 | 0.176 |

Formulation of epoxy composite to produce a durable well seal for low-temperature, large-volume applications involves first assessing the application conditions, well geometry, and determining resin slurry properties required for placement (rheology, density, handling time, set time). Then, an epoxy-solids composite formulated to induce post placement self-segregation of the sealant into a solids depleted and a solids enhanced region is evaluated for improvements in the thermal properties of the solids rich portion based on the six performance criteria set forth above.

Shear Bond Testing

Figure 5:
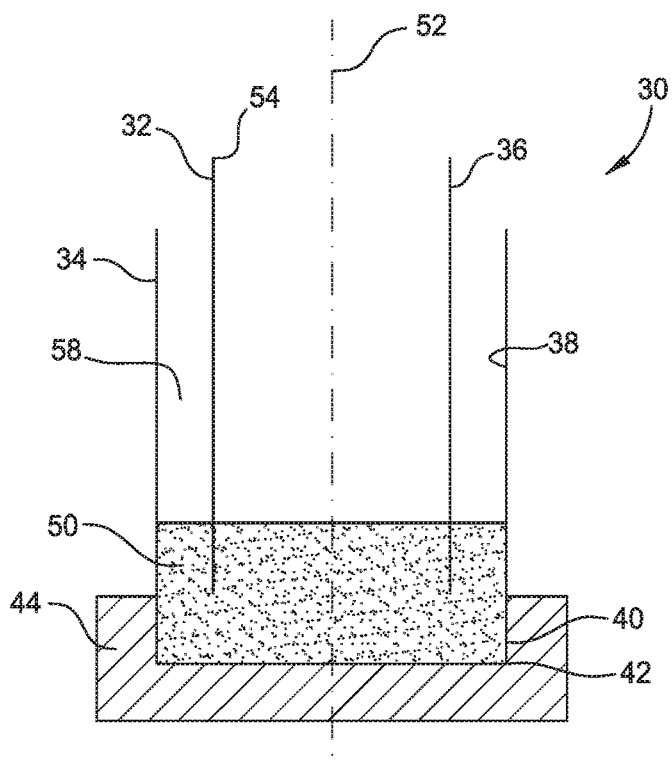
FIG. 5 is a sectional schematic view of a test fixture for testing shear bond strength of an epoxy sealant.

To determine the shear bond strength as set forth in Table 3 hereof, the inventors hereof developed a shear bond test and test fixture 30. As shown in section in FIG. 5, the test fixture 30 includes a non-threaded 6-inch long by 2-inch diameter schedule 40 black pipe 32 located within a threaded 6-inch long by 3-inch diameter schedule 40 black pipe 34. The outer surface 36 of 2-inch pipe 32, and the inner surface 38 of three inch pipe 34, are sandblasted, then washed with soap and water, and lastly rinsed with acetone.

After being rinsed with acetone, the threads 40 on one end 42 of the 6-inch long by 3-inch diameter schedule 40 black pipe are wrapped with Teflon tape and a high pressure cap 44 is threaded onto the taped end of the pipe. Afterwards, the fixture 30 is supported vertically with the open ends of the pipes 32, 34 facing upwardly. The bottom 2-inches of pipe 34 is filled with 100 mesh sand and then the pore space of the sand bed is filled with a calcium chloride brine. The brine saturated sand bed 50 prevents the test fluid, i. e., the epoxy or the epoxy-solids composite from filling the cap 44. At this point, the 6-inch long by 2-inch diameter pipe 32 is located within the 3-in diameter pipe 34 and forced 1-inch into the saturated sand bed 50. Note, the inner pipe 32 is centralized, i.e., the centerline 52 of both pipes 32, 34 are the same or very close to the same, and the upper end 54 thereof ensured to be level with the use of a ruler and level. At this point, the fixture 30 is ready to be filled with a sealant fluid to be shear tested.

The sealant fluid to be tested, in this case resin based epoxy formulations, are mixed with an IKA RW 20-digital tabletop mixer coupled with a 3 bladed propeller stirrer. The mixer is gradually ramped up to 600 rpm+/−50 rpm with the propeller located at ¾ of the base resin component of the epoxy sealant height in the mixer. The resin components are then added with each mixture stirred for 1 min before proceeding to the next component. Once all components including accelerator and hardener have been fully added, the mixture is allowed to continue mixing for a 30 min conditioning period. The epoxy (or epoxy-solids composite) is then ready to be poured into the shear bond test fixtures.

Figure 6:
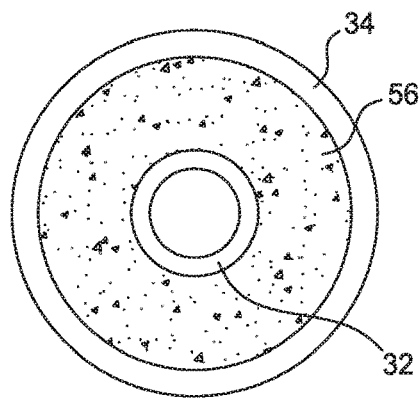
FIG. 6 is an end view of the test fixture of FIG. 5.

The epoxy 56 in fluid form is then poured into the annular space 58 between the pipes 32, 34, until the fluid level of the epoxy 56 is ½-inch (12 mm) from the top lip 60 of the 3-in diameter pipe. Once poured into the fixture, the epoxy 56 (including epoxy solids composites) is allowed to cure for a designated curing time period. After the designated curing time period has elapsed, the epoxy 56 is ready for shear bond testing. A cross-sectional view of a pipe-in-pipe configuration for shear bond testing is illustrated in FIG. 6.

Shear Bond Test Procedure

Once the epoxy has cured, the high pressure cap 44 and saturated sand bed 50 are removed. Then a caliper is used to measure the precise length 62 of the 3-in diameter pipe 34, the depth 64 from the bottom lip of the 3-inch diameter pipe to the bottom of the cured annular epoxy 56 sealing plug, and the depth 66 from the top lip of the 3-inch diameter pipe to the top of the annular epoxy 56 sealing plug. With these measurements, the effective annular plug length can be calculated. In addition, the precise dimensions of the outer pipes 34 inside diameter 68 and the inside pipes' 32 outer diameter 70 is recorded. This allows correlation of results from test to test for different areas of contact between the epoxy 56 and the pipes 32, 34. The test fixtures are then ready to be tested.

Figure 7:
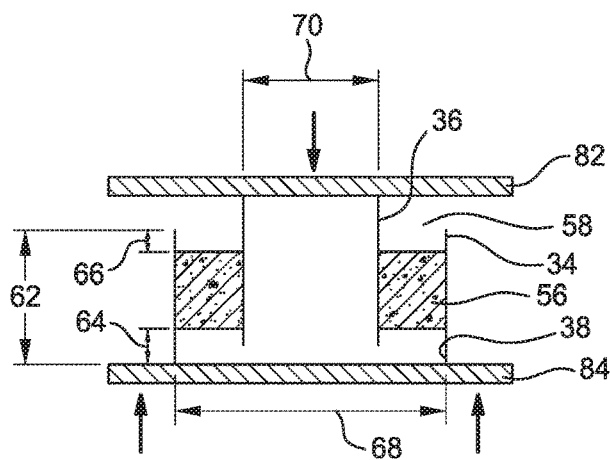
FIG. 7 is a sectional view of the test fixture of FIG. 5 having sealant therein in a load frame.

The fixture is then centered inside a load frame and a safety shield is closed and securely locked. As shown in FIG. 7, the top plate 82 of the load frame is lowered until it engages with the top 54 of the inner pipe 32 while the lower end of outer pipe 34 rests on the lower plate 84 of the load frame. Hydraulic pressure is then applied to the loaded fixture until bonding failure of the epoxy 56 to the inner wall 38 of outer pipe 34 or to the outer wall 36 of the inner pipe 32, or internal failure of the seal, is observed. Once failure is noted, the test stops and the pipe 32 or 34 is not pushed out of the annular epoxy 56 seal material.

At the conclusion of the test, the maximum load value is recorded and later used for calculating shear bond results. Theoretically, failure should occur in the inside pipe 32 to annular epoxy interface due to the lesser surface area between the inner pipe 32 and the annular epoxy versus that of the annular epoxy to outer pipe 34.

Shear Bond

The shear bond test measures the stress necessary to break the annular plug to inner pipe bond by applied force to the inner pipe while holding the outer pipe. The shear bond is calculated by dividing the shear bond force necessary to move the internal pipe with respect to the annular epoxy 56 sealant plug to inner pipe 32 interface, using Eq. 1.1 and 1.2.

$$\tau = P/A \tag{1.1}$$

and $$A = L * \pi D \tag{1.2}$$

where:
$\tau$=shear bond of the material
P=shear bond force applied to move the inner pipe
A=area of the inner pipes outer surface traversed by the annular plug
L=effective length of the annular plug
D=outer diameter of the inner pipe
$\pi$=the mathematical constant Substituting equation 1.2 into equations 1.1, the shear bond is expressed in terms of length L and diameter D in equation 1.3.

$$\tau = \frac{P}{L * \pi D} \tag{1.3}$$

Application Example

As shown schematically in FIG. 1, an offshore well targeted for abandonment includes a plurality of telescoping casings 2 extending from the sea floor 1, or slightly thereabove, to the producing formation 09 located inwardly of the earth. The distance between the seafloor and the producing formation(s) is on the order of thousands of feet, whereas the diameter of the casings is on the order of several feet to less than one foot. The series of telescoping casings 02 through 05 were previously cemented in place in the drilled well bore by cement extending between at least portions of the lengths thereof and the adjacent earth formations of the drilled bore, and cement is also located in at least a portion of the annulus where the smaller casing extends inwardly of an overlying larger casing. A production tubing 06 is isolated from the casings by a production packer 07. The casing extending through, or into, a producing formation includes perforations 08 therethrough to provide a hydrocarbon flow path from the producing formation 09 into the well bore.

Figure 2:
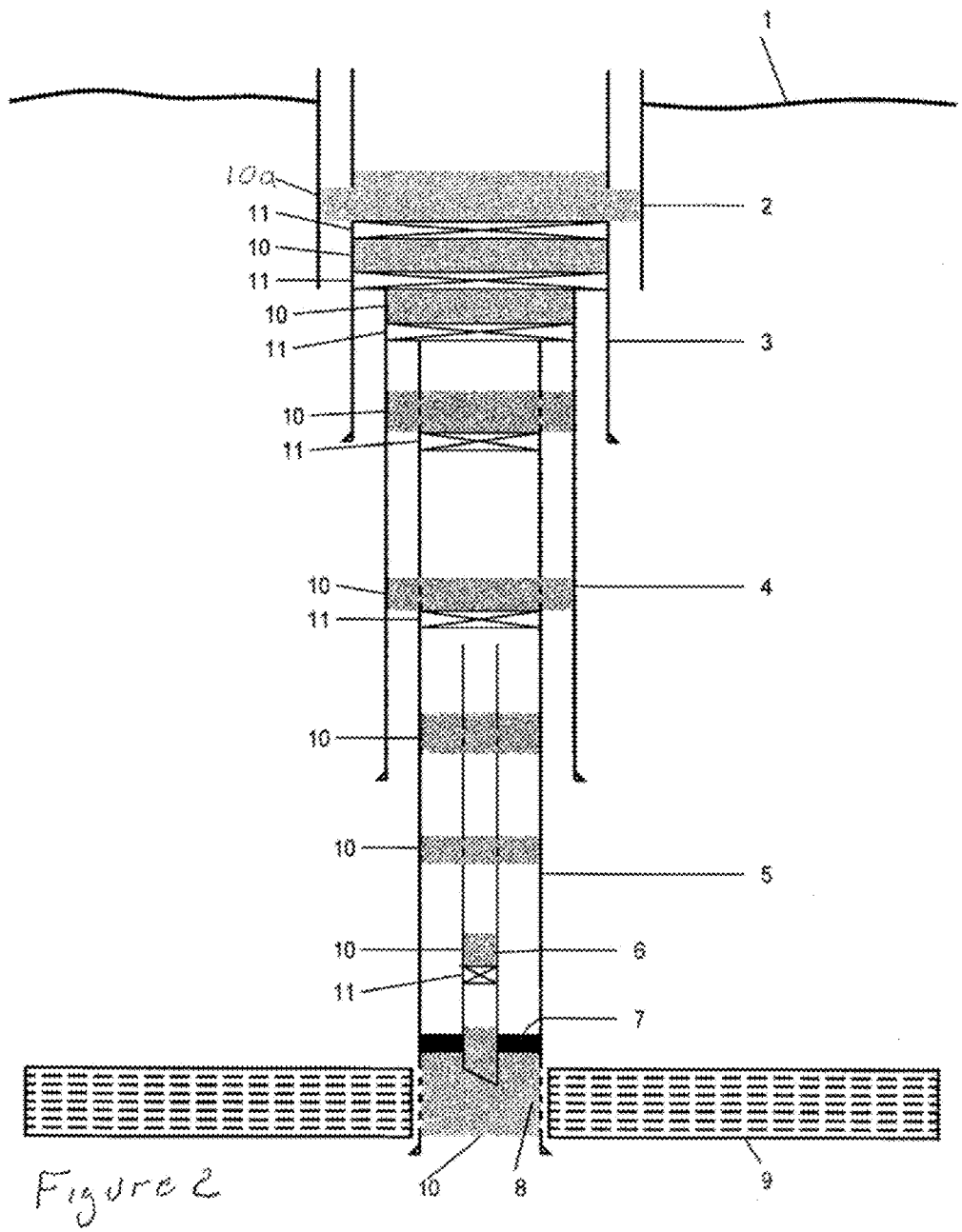
FIG. 2 is a schematic sectional view of the well of FIG. 1 with normal abandonment operations complete up to installation of the final plug at the top of the well.

FIG. 2 illustrates the same well with normal abandonment operations completed prior to installation of the final plug at the top of the well. At this point in the well abandonment operation, portions of the production tubing 06 and casings 05 and 04 have been cut at locations below the seafloor and removed. A series of mechanical plugs 11 and Portland cement sealant plugs 10 were then placed in casings 2, 3, 4, 5 and 7 and production tube 6. The uppermost plug 10a is subject to strict performance testing to ensure final seal integrity, and thus the overall sealing integrity of the well. For some wells, abandonment is complicated by well seal failures that result in reaching this critical final abandonment step without achieving a seal at the sealing locations deeper in the well and at the uppermost installed sealing location of plug 10a. In this situation, fluid from lower formations in the well will find a pathway up to through the uppermost plug 10a as evidenced by observation of hydrocarbon leakage through the uppermost plug 10a. The presence of a leak at this stage of abandonment is critical since governing agencies will not approve the abandonment if there is leakage at this point, and little room exists to attempt placing more plugs to stop the leak. Epoxy is often the sealant of choice for this final attempt to plug the well, because the length (height) of an epoxy resin plug having the same sealing properties as a Portland cement seal is significantly smaller than that of the equivalent Portland cement seal, and the shorter required sealing plug lengths using epoxy resin will more easily fit into the remaining depth of the well bore and casing 2, 3 adjacent to the top of the well. The diameter of the upper casing ranges from 18 inches to 30 inches, creating the need for a large resin volume to be placed into a cylindrical space with a low surface area to volume ratio. Since well temperatures at these well depths usually range from 65° F. to 80° F., the thermal properties of epoxy resin can result in excessive stress generation in the solid epoxy seal during and after setting and then cooling, and associated seal failure.

Figure 3:
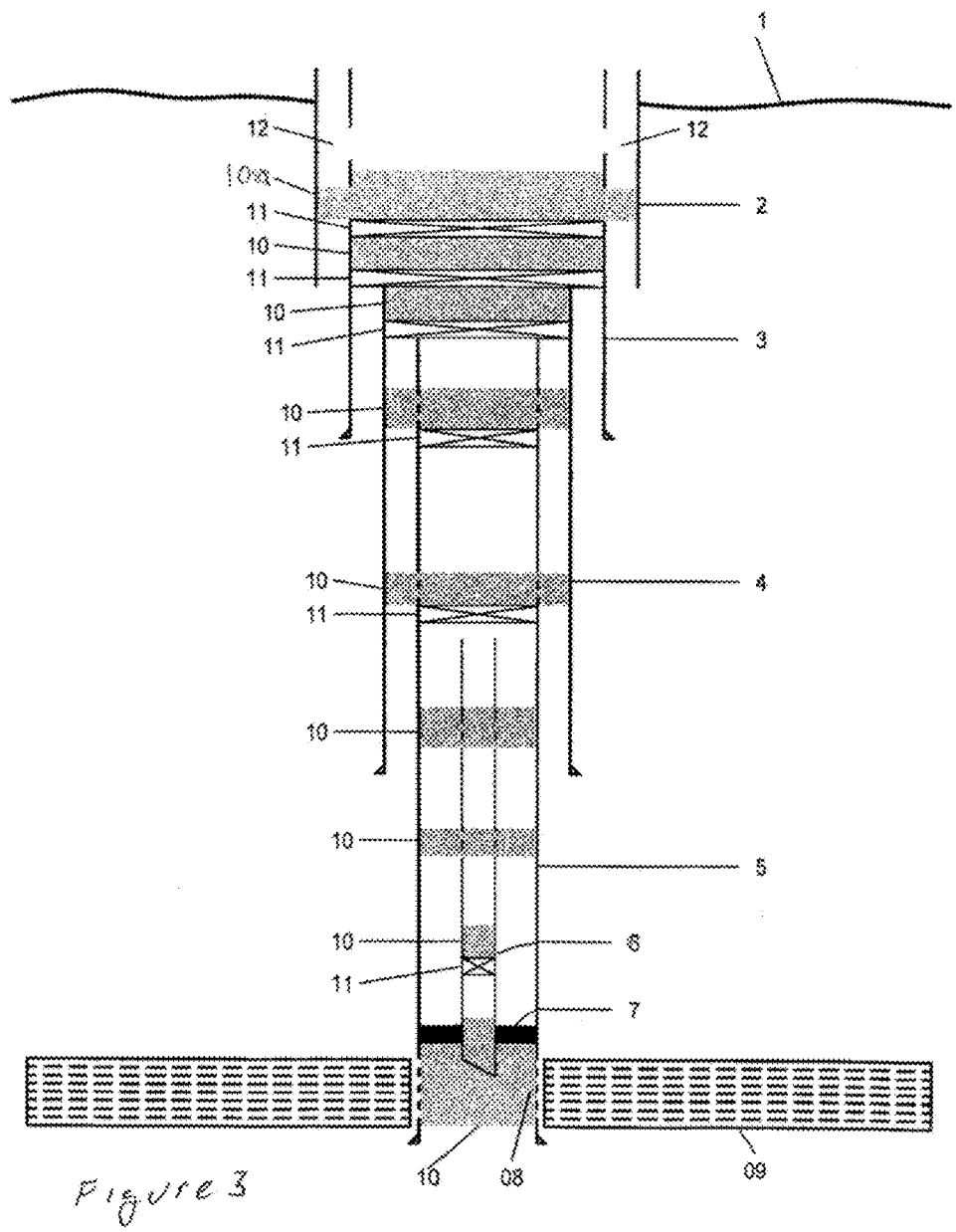
FIG. 3 is a schematic sectional view of the well of FIG. 2 prepared to set an epoxy resin plug above the plug that has leaked.

FIG. 3 illustrates the well prepared to set an epoxy plug therein above a uppermost plug 10a that has leaked. In this case, a window 12 is milled through the casing 3 and through any cement thereabout to the casing 2 inner wall to allow sealant to flow therein and block any flow paths that might also exist in the annulus between casings 2, 3.

Figure 4:
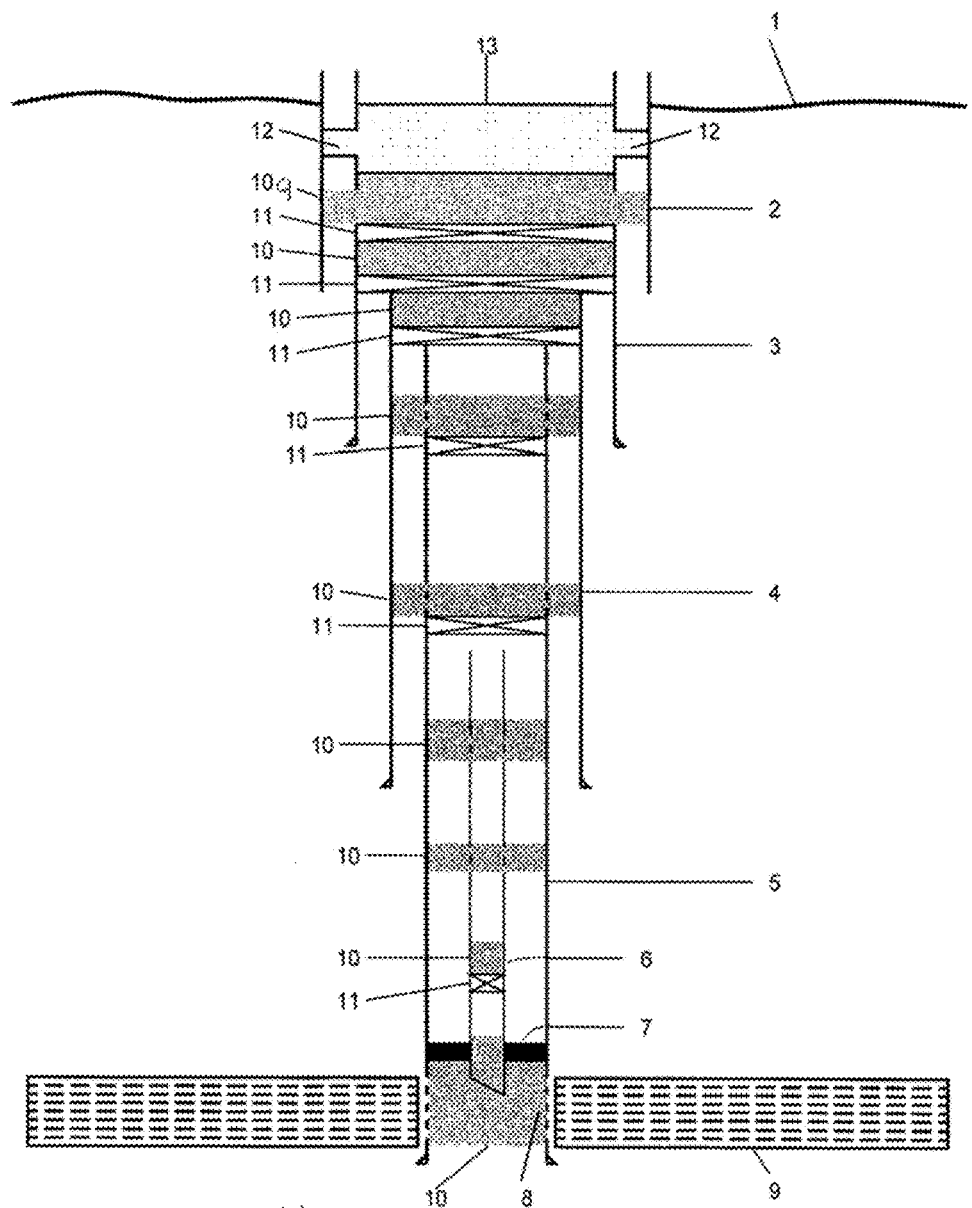
FIG. 4 is a schematic sectional view of the well of FIG. 3 with the epoxy resin plug set in place.

FIG. 4 shows the epoxy seal plug 13 installed above uppermost Portland cement plug 10a in the bore of the casing 3 and extending continuously therefrom into the annulus between casings 2, 3, ultimately into sealing contact with the inner wall of casing 2. The procedure for placement begins with proper formulation, also known in the art as the "design" of the epoxy resin and particulate composition to allow adequate mixing and placement time before setting, to produce an epoxy solids composite whereby the solids, or a portion thereof, will settle or migrate under the influence of gravity into a lower portion of the column of sealant, and to ensure the composite is mixable with current field blenders and pumpable with current field pumps. The materials to be intermixed to form the epoxy seal plug 13 are gathered at the work location, mixed and pumped into the well through coiled tubing, jointed tubing, or by a dump bailer to form a column of a solids enhanced volume of sealant, in the casing bore and annulus, on the order of 20 to 30 feet in height. The epoxy having the solids incorporated thereinto is allowed to set in place and is then tested for seal integrity. Using a seal designed using the performance factors described herein, and incorporating settling solids, results in a seal with a high degree of reliability as a result of the sealing material, or the sealed plug formed therewith, not developing cracks therein, and not pulling away from the adjacent metal of the casing, as a result of the sealing material shrinking after partially or fully hardening.

Figure 8:
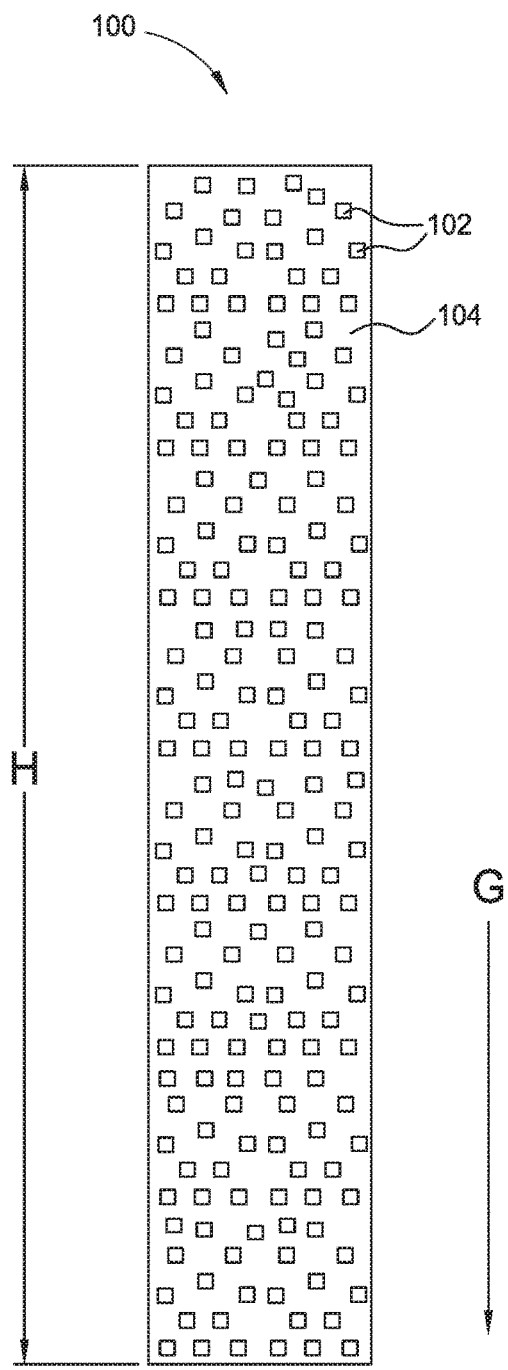
FIG. 8 is a sectional schematic view of a column of sealant, showing the sealant as dispensed or located at a sealing location in a well.
Figure 9:
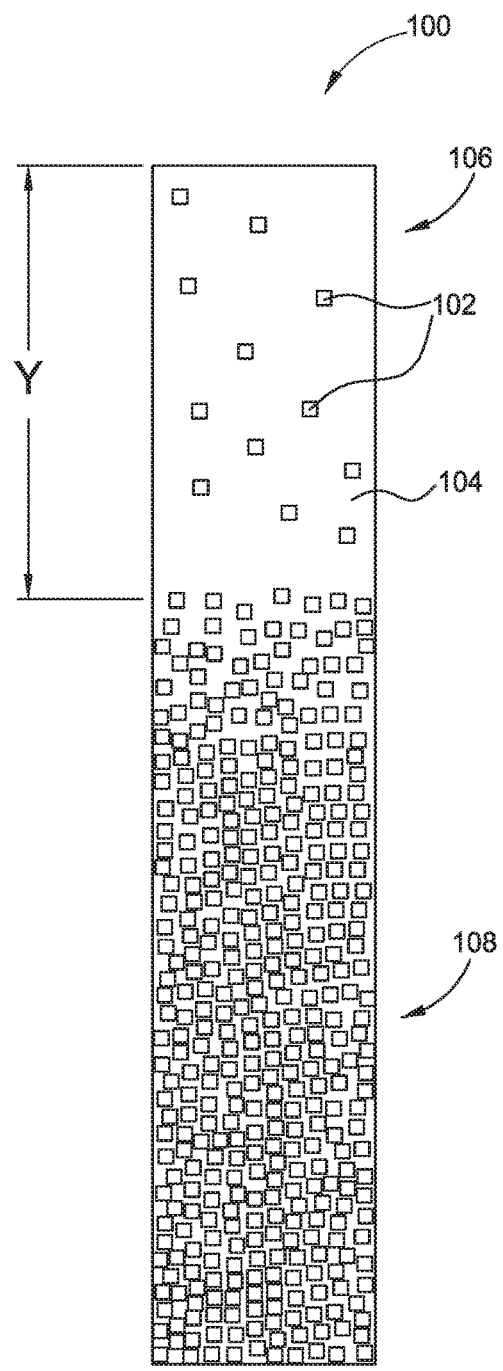
FIG. 9 is a sectional schematic view of a column of sealant, showing the sealant after solids have settled or migrated from the upper portion thereof to form a solids enhanced volume in the lower portion thereof.

In FIGS. 8 and 9, a volume of sealant 100 is shown as a column, for example, a column which is formed in a sealing location within an oilfield tubular such as casing. In FIG. 8, the sealant is shown as received at a sealing location as an epoxy-solids composite having a height H, wherein the distribution of the solids 102 in the column is fairly evenly distributed throughout the volume of epoxy 104, and at or near the highest concentration of solids where the sealant is still pumpable.

In FIG. 9, the solids 102 in the sealant 100 have migrated under the influence of gravity, as shown by vector G, such that an upper portion 106 of the sealant volume over a depth or height y is nearly depleted of solids 102, such that epoxy 104 remains substantially continuously therein. In contrast, over the depth or height of the lower portion 108 of the sealant 100 below the upper portion 106 is now solids enhanced, or solids rich, wherein the solids 102 originally in the upper portion 106 have migrated or settled into the lower volume 108, such that the lower volume has a solids concentration exceeding that of a pumpable composite. Herein, the minimum height of the sealing portion, i.e., the solids enhanced lower volume of the column of sealant is preferably 20 feet, more preferably 30 feet. Additionally, although the column is shown in the figures as extending along a direction perpendicular to the earth's surface, an incline of up to 70 degrees is specifically contemplated.

While the foregoing is directed to embodiments of the present invention, other and further embodiments of the invention may be devised without departing from the basic scope thereof, and the scope thereof is determined by the claims that follow.

We claim:

1. A method of formulating a sealant to span an opening and form a seal with surfaces around the opening at a sealing location; comprising:
    selecting a fluid material capable of contacting and adhering to the surfaces around the opening and which reacts to form a solid material as a result of reaction thereof; and
    selecting and intermixing at least one solid particulate material with the fluid material to form a composite;
    locating the composite at the sealing location prior to the formation of the solid material, and wherein the at least one solid particulate material to move migrates within the composite to form a solids enhanced portion and a solids depleted portion of the composite at the sealing location;
    wherein the solids enhanced portion has at least one of the following properties:
    a thermal expansion factor of 45 or less;
    an exothermic factor of 1.1 or less;
    a heat flow factor of 5.5 or less;
    a heat duration factor of 55 or less; and
    a set time/cool down factor of 1.0 or less.

2. The method of claim 1, wherein the at least one solid particulate material is a first solid particular material and a second solid particulate material.

3. The method of claim 2, wherein a particle size of the first solid particulate material is larger than a particle size of the second solid particulate material.

4. The method of claim 3, wherein the solids enhanced portion comprises the first solid particulate material and the second solid particulate material, and the solids depleted portion includes the second solid particulate material and no first solid particulate material.

5. The method of claim 2, wherein the second solid particulate material has at least one of a different coefficient of thermal expansion (CTE), a different heat capacity, or a different coefficient of heat transfer as compared to the first solid particulate material.

6. The method of claim 2, wherein at least one of the first and/or second solid particulate materials has at least a lower coefficient of thermal expansion (CTE), a higher heat capacity, or a higher coefficient of heat transfer than the fluid material.

7. The method of claim 1, wherein the fluid material comprises at least one resin and one hardener reactable with the resin to form the solid material.

8. The method of claim 1, wherein the at least one solid particulate material comprises at least one of magnesium oxide, sand, silicon carbide, and graphite.

9. The method of claim 1, wherein prior to locating the composite at the sealing location, the at least one solid particulate material is about 22% to about 30% by volume fraction of the composite.

10. The method of claim 1, wherein the solids enhanced portion has all of the following properties:
the thermal expansion factor is 45 or less;
the exothermic factor is 1.1 or less;
the heat flow factor is 5.5 or less;
the heat duration factor is 55 or less; and
the set time/cool down factor is 1.0 or less.

11. A method of formulating a sealing material, comprising:
selecting a fluid material capable of contacting and adhering to a surface of a downhole location to be sealed and which solidifies as a result of a hardening reaction thereof after a desired passage of time;
selecting a first solid particulate for incorporation into the fluid material to form the sealing material, the first solid particulate having at least one of a lower coefficient of thermal expansion (CTE), a higher heat capacity, or a higher coefficient of heat transfer than the fluid material;
also selecting the first solid particulate based on the ability of the first solid particulate to migrate, under the influence of gravity, downwardly in the sealing material to form a solids enhanced portion of the sealing material before a viscosity of the sealing material which changes as the result of the hardening reaction prevents movement of the first solid particulate;
incorporating the first solid particulate into the fluid material to form the sealing material; and
pumping the sealing material to the downhole location to be sealed, wherein a solids depleted portion and the solids enhanced portion of the sealing material form prior to the solidification of the sealing material at the downhole location to be sealed as the result of the hardening reaction of the fluid material;
wherein the solids enhanced portion has at least one of the following properties:
a thermal expansion factor of 45 or less;
an exothermic factor of 1.1 or less;
a heat flow factor of 5.5 or less;
a heat duration factor of 55 or less; and
a set time/cool down factor of 1.0 or less.

12. The method of claim 11, further comprising selecting a second solid particulate for incorporation into the fluid material, the second solid particulate having at least one of a lower CTE, a higher heat capacity or a higher coefficient of heat transfer than the fluid material.

13. The method of claim 12, wherein the second solid particulate is also selected based on the ability of the second solid particulate to migrate, under the influence of gravity, downwardly in the sealing material with the first solid particulate to form the solids enhanced portion before the viscosity of the sealing material which changes as the result of the hardening reaction prevents movement of the second solid particulate.

14. The method of claim 11, wherein the solids enhanced portion has all of the following properties:
the thermal expansion factor is 45 or less;
the exothermic factor is 1.1 or less;
the heat flow factor is 5.5 or less;
the heat duration factor is 55 or less; and
the set time/cool down factor is 1.0 or less.

15. The method of claim 11, wherein the first solid particulate comprises at least one of magnesium oxide, sand, silicon carbide, and graphite.

16. The method of claim 11, wherein prior to pumping the sealing material to the downhole location to be sealed, the first solid particulate is about 22% to about 30% by volume fraction of the sealing material.

17. A sealing material comprising:
a continuous fluid material capable of contacting and adhering to a surface of a location to be sealed and which reacts to form a solid material as a result of an exothermic reaction thereof; and
one or more solid particulates intermixed in the fluid material to form the sealing material;
wherein the one or more solid particulates are about 22% to about 30% by volume fraction of the sealing material upon being intermixed in the fluid material;
wherein at a location to be sealed, the sealing material includes:
a first portion having a first concentration of the one or more solid particulates;
a second portion having a second concentration of the one or more solid particulates, wherein the second concentration is less than the first concentration;
wherein the second portion is located above the first portion, and wherein the first portion has at least one of the following properties:
a thermal expansion factor of 45 or less;
an exothermic factor of 1.1 or less;
a heat flow factor of 5.5 or less;
a heat duration factor of 55 or less; and
a set time/cool down factor of 1.0 or less.

18. The sealing material of claim 17, wherein the one or more solid particulates includes a first solid particulate and a second solid particulate.

19. The sealing material of claim 17, wherein the one or more solid particulates, when the fluid material is in a fluid state, is capable of moving therein under the influence of gravity.

20. The sealing material of claim 17, wherein the first portion has all of the following properties:
the thermal expansion factor is 45 or less;
the exothermic factor is 1.1 or less;
the heat flow factor is 5.5 or less;
the heat duration factor is 55 or less; and
the set time/cool down factor is 1.0 or less.

21. The sealing material of claim 17, wherein the one or more solid particulates comprises at least one of magnesium oxide, sand, silicon carbide, and graphite.

22. The sealing material of claim 17, wherein the first concentration is about 40% to about 55% by volume fraction of the first portion.

* * * * *